US012586198B2

(12) United States Patent
Smith et al.

(10) Patent No.: US 12,586,198 B2
(45) Date of Patent: Mar. 24, 2026

(54) IMAGE ANALYSIS FOR IDENTIFYING OBJECTS AND CLASSIFYING BACKGROUND EXCLUSIONS

(71) Applicant: Techcyte, Inc., Orem, UT (US)

(72) Inventors: Richard Boyd Smith, Manatí, PR (US); Shane Swenson, Cottonwood Heights, UT (US); Bryan J. Worthen, South Jordan, UT (US)

(73) Assignee: Techcyte, Inc., Orem, UT (US)

( * ) Notice: Subject to any disclaimer, the term of this patent is extended or adjusted under 35 U.S.C. 154(b) by 609 days.

(21) Appl. No.: 18/172,191

(22) Filed: Feb. 21, 2023

(65) Prior Publication Data

US 2023/0281819 A1     Sep. 7, 2023

Related U.S. Application Data

(60) Provisional application No. 63/311,866, filed on Feb. 18, 2022.

(51) Int. Cl.
*G06T 7/10*          (2017.01)

(52) U.S. Cl.
CPC ...... *G06T 7/10* (2017.01); *G06T 2207/10056* (2013.01); *G06T 2207/20084* (2013.01)

(58) Field of Classification Search
CPC . G06T 2207/10056; G06T 2207/10061; G06T 2207/20084; G06T 2207/20081; G06T 2207/30004–30101; G06T 7/10–194
See application file for complete search history.

(56) References Cited

U.S. PATENT DOCUMENTS

| | | | | |
|---|---|---|---|---|
| 2019/0385021 A1* | 12/2019 | Sasaki | ..................... | G06N 3/045 |
| 2021/0215481 A1* | 7/2021 | Zhai | ..................... | G06N 3/0464 |
| 2023/0009925 A1* | 1/2023 | Sekii | ......................... | G06T 9/00 |
| 2023/0125890 A1* | 4/2023 | Hasegawa | ............ | G06V 10/255 |
| 2024/0029394 A1* | 1/2024 | Sekii | ......................... | G06T 7/75 |

* cited by examiner

*Primary Examiner* — Sean T Motsinger

(74) *Attorney, Agent, or Firm* — TechLaw Ventures, PLLC; Terrence J. Edwards

(57) ABSTRACT

Labeling protocols for training datasets and systems and methods for classifying objects of interest and identifying backgrounds. Labeling protocols described herein enable grid units within an image to be excluded from contributing to a loss function, and further enable granular controls for specifying which grid units should contribute to object predictions. A method partitioning an input image into a plurality of grid units and individually processing each of the plurality of grid units with a neural network configured to calculate a confidence score indicating a likelihood that a grid unit comprises an object of interest. The method includes generating a bounding box around the object of interest, identifying one or more grid units of the plurality of grid units that comprise a portion of the bounding box, and identifying which of the one or more grid units comprises a center point of the bounding box.

20 Claims, 19 Drawing Sheets

100

300

302

304

304

Wrong: Box Is Too Small

Too Labor Intensive: Box
Tries To Attempt Box Exactly;
Consumes Excessive
Processing Resources Ideal: One Pixel Margin
Around Object Wrong: Too Much Margin
Around Object

IMAGE ANALYSIS FOR IDENTIFYING OBJECTS AND CLASSIFYING BACKGROUND EXCLUSIONS

TECHNICAL FIELD

The present disclosure relates to systems and methods for image analysis and particularly relates to identifying objects and labeling image regions in complex images.

BACKGROUND

Computer-based image analysis uses algorithms and techniques to extract information from digital images. The use of digital image analysis has grown rapidly in recent years, as advances in computer technology and imaging hardware have made it increasingly feasible to capture and store significant quantities of digital image data. Applications of image analysis are diverse, including medical imaging, data analysis, surveillance imaging, robotics, automated vehicle sensing, quality control in manufacturing, and so forth.

In medicine, image analysis can be used to examine microscopy slide images, endoscopy images, X-ray images, and other medical imaging mediums. Automated image analysis can be implemented to identify viruses or bacteria, identify irregularities in cellular function, diagnose diseases, track the progression of diseases, monitor the effectiveness of treatments, and so forth. However, implementing computer-based image analysis of certain medical images, such as microscopy slide images, raises various technical challenges due to the quality of some medical imaging.

Automatic image analysis of microscopy slides poses several challenges due to the complexity of the images and the variability in image quality. Some of the key challenges include variability in sample preparation, i.e., the quality of microscopy slide image is largely dependent on sample preparation, and variations in the thickness of the sample, the staining protocol, and other factors can result in differences in image contrast, brightness, and other parameters that affect image analysis. Additionally, microscopy slide images may include significant noise and image artifacts that interfere with image analysis. For example, the slide images may include speckle noise caused by interference patterns, distortions caused by dust, and scratches or other imperfections on the slide or microscope lens. Additionally, microscopy slide images exhibit variability in object size and shape, and this can make it difficult to identify and segment objects automatically. Further, microscopy slide images are computationally complex due to the complexity of the images, the number of image classifiers within the training dataset, and the difficulties in identifies objects of interest.

In view of the foregoing, disclosed herein are improved systems, methods, and devices for image analysis that may specifically be applied to complex images such as those retrieved from microscopy slide imaging. The systems, methods, and devices described herein implement deep learning algorithms to identify and classify objects of interest in an efficient and accurate manner.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. It will be appreciated by those of ordinary skill in the art that the various drawings are for illustrative purposes only. The nature of the present disclosure, as well as other embodiments in accordance with this disclosure, may be more clearly understood by reference to the following detailed description, to the appended claims, and to the several drawings.

DETAILED DESCRIPTION

Figure 1:
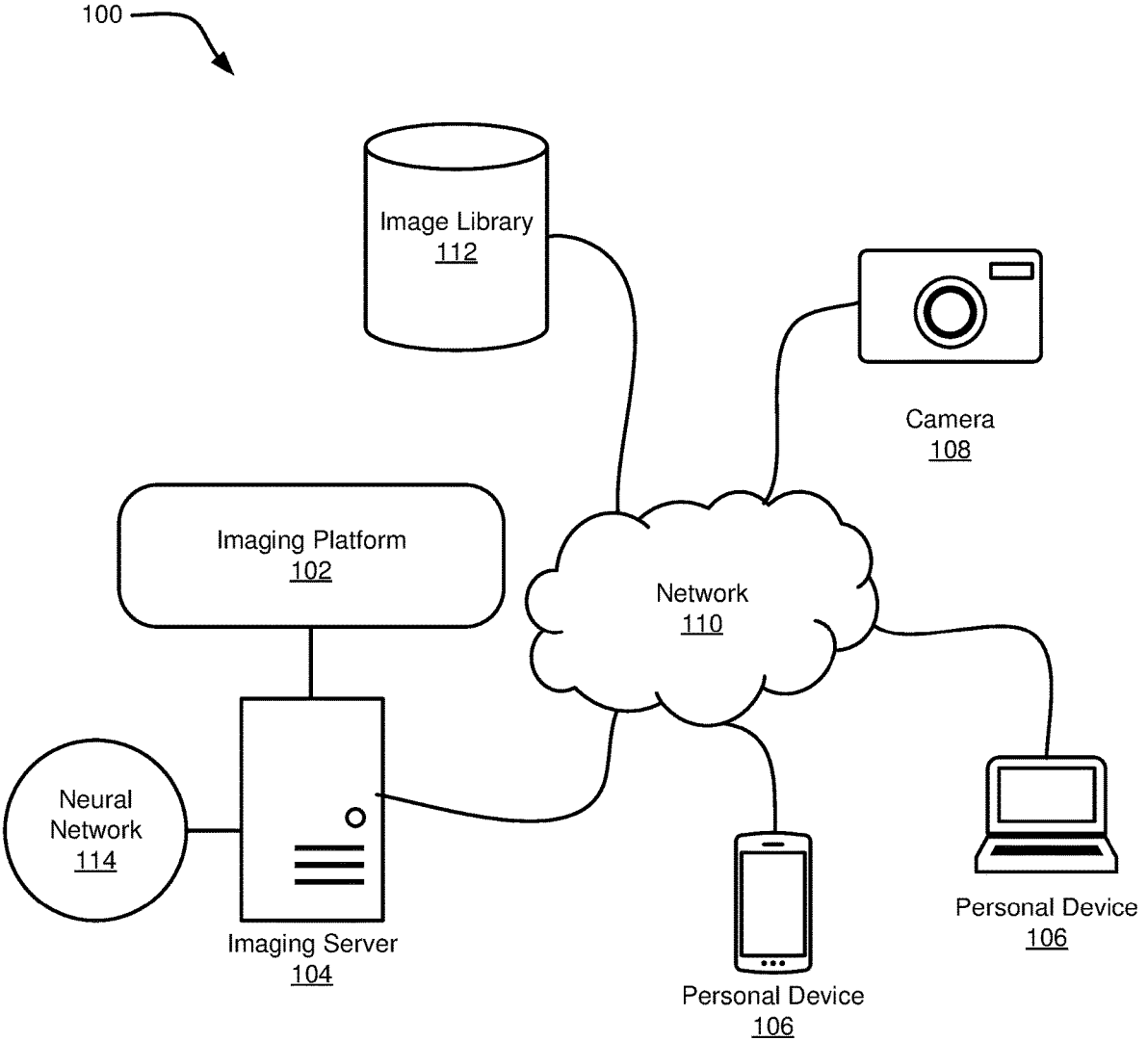
FIG. 1 illustrates a schematic diagram of a system for imaging and machine learning classification or detection of particulates or materials.

Disclosed herein are systems, methods, and devices for image analysis for identifying objects and classifying background exclusions. The systems, methods, and devices described herein significantly increase the speed and accuracy of machine learning processes for classifying objects within an image. The processes described herein may specifically be implemented when classifying particles, biological material, viruses, and so forth.

Specifically described herein are training methods and labeling protocols for training a neural network to classify objects of interest within an input image. The labeling protocol described herein includes numerous labeling classifications for drawn bounding boxes, including explicit background classification, explicit foreground classification, and exclude classifications. A loss function on the neural network trains the neural network to make object of interest predictions within bounding boxes comprising the foreground classification, while ignoring data within bounding boxes comprising the background classification or exclude classification. The explicit labeling protocols described herein enable granular fine-tuning of the neural network to identify only certain objects of interest within an input image.

Microscopy slide images are particularly challenging to classify with machine learning algorithms. Slide images may include a relatively small quantity of rare cells that need to be labeled. These rare cells may be surrounded by hundreds or thousands of non-rare cells that also need to be labeled which creates a significant labeling burden for traditional object detection algorithms. Additionally, slide images typically contain objects that are occluded, blurry, difficult to discern, can be very dense, and are often mislabeled by algorithms and humans. When these objects are included in a training scene, they must be labeled as either a foreground or background class which is problematic when these features create ambiguity about what the object really is. This makes it challenging to create a reliable training data set for training a machine learning algorithm because it will either contain bad labels or ambiguous labels must be excluded. When ambiguous labels are abundant, a sizable portion of the already rare objects become even more difficult to add to training without introducing mislabeled objects. Explicitly labeling background areas, rather than implicitly assuming everything that it not labeled as foreground is background, creates much greater control around what parts of the scene are learned and what is excluded from training. Disclosed herein are improved classification processes that resolve these issues and increase the likelihood that a machine learning algorithm quickly and accurately classifies particles and other materials within a slide image.

The systems and methods for image analysis described herein can be applied to the analysis of laboratory slides that include, for example, microscopy images of bacteria, viruses, particles, cells, and other organisms. The slides and other information may be received from a user, customer, technician, or other entity that has obtained one or more samples. For example, a lab worker may receive the one or more slides and load the slides into a scanner for imaging. The lab worker may scan a barcode on the slide that links the slide with other information about the slide (e.g., a customer, location, health symptoms, and sample type). The barcode may be used to automate where to look on the slide to locate the particulates from the sample.

Samples may be imaged using a wide range of different imaging techniques and at a wide range of different zoom levels. Example scanners or imagers that may be used include a digital microscope, bright-field microscope, polarized imager, phase contrast image, fluorescence imager, scanning electron microscope, dark-field microscope, or other types of scanners/imagers. During scanning or imaging of the sample, the scanner (such as a digital microscope) may be used to scan or image the whole area where the sample is located (e.g., where any mold particulates or other materials are located). These obtained images may be quite large in pixel count and memory size. For example, the images may be in full color (16-bit, 24-bit, 32-bit or more)

with extremely high resolution (pixel count and/or dots per inch). In one embodiment, the imaging/scanning process obtains not only images of the whole area, but also images at different resolutions. For example, the sample area may be divided up into a grid of smaller sized areas, which are each imaged at a high zoom level and then multiple grid areas may be imaged together at a lower/wider zoom level. Different zoom levels may be helpful in imaging/identifying varied sizes of particulates or detecting details for identifying different material types. For example, a single sample may include particles of varied sizes that would be helpful to detect and identify.

After imaging, the resulting digital images may be stored or associated with a serial number identifying the location where the sample was taken, a customer that obtained the image samples, or any other information about the location, sample, type, study type, medical conditions, or the like. The digital images may be stored and transmitted to a cloud storage or remote storage location for training, analysis, classification, association, or aggregation with other data, or the like. For example, the lab may acquire the images and upload to a file server. The file server may include a listener that detects the uploading of new images and uploads those to a remote classification system for classification, storage, reporting, and/or sharing. Related data may also be uploaded with the image for storage at a remote or cloud location. Custody tracking of the sample, digitized images, and associated data may be provided to ensure security and accuracy of the data. In one embodiment, images, customer information, health information, or the like may be associated with a common serial number or other identifier so that correlations between various data can be determined.

Data stored in the remote or cloud storage may include data, including images and related data, from many different labs, customers, locations, or the like. The stored data may be accessible to a classification system that includes a classification model, neural network, or other machine learning algorithm. The classification system may classify each image (or sample associated with the image) as including a particular type of particle. For example, the classification system may analyze each image to classify or detect particles within the images. A particle may be classified as a specific genus or species of mold spore, or other particle type. For example, the classification system may generate a heat map for an image indicating which regions of the image include diverse types of particles.

As another example, the classification system may generate proposal regions and then detect/classify particles in them. For example, the proposal regions may indicate areas where there is likely something to be present (e.g., a mold spore) to be classified or detected. This may allow analysis or processing of only portions of the image using a neural network or algorithm to locations where particles or materials are present and ignoring regions where there are not particles. For example, large regions of an image may be blank or white space where no particles are present. Processing blank or white space regions using neural networks may be a waste of computing resources. The image processing algorithm or neural network used by the classification system may include a system trained based on human classified images or samples. For example, the neural network may be trained using supervised learning. In one embodiment, learning and training may be performed using unsupervised machine learning.

In one embodiment, the classification system may provide one or more images (or portions of images) of samples to users for classification. For example, previously classified or unclassified images may be provided to one or more experts for classification. The experts may provide their own classification, which may be used to either confirm or change an original classification. The machine learning algorithms, models, or neural networks may be retrained based on the updated classifications to further improve machine learning models and algorithms. In one embodiment, changes to classifications for specific particles or images may be tracked. Tracked classifications may provide additional data about the accuracy of classifications and can lead to further refinement in machine learning and classification algorithms and models.

Based on classification of particles within samples, reports may be generated for the type of study that is being performed for a location, patient, or customer. The report may be generated based on the classification of particles within images of samples, particle counts for different particle types, health conditions related to the presence or counts for specific particle types, or the like. The report may be automatically generated specific to the serial number, customer, and/or location associated with the images and the corresponding sample. In one embodiment, a report may include a report for the types of particles detected, the number of particles, likely conditions in the sampled environment or patient, recommended steps to be performed, or the like. The report may be provided as a general report for a specific particle type or may be more general to health or conditions for a sample environment.

As used herein, the term "particle" is given to mean any small unit or portion of material such as dust, mold sports, cells or groups of cells, fibers, viruses, small chunks of materials, organism(s), tissue, biological matter, minerals, or any other item or material discussed herein as being classified or detected. Additionally, the classification, detection, or identification of particles may include identifying a specific type of particle or condition of a specific particle or material.

Embodiments disclosed herein may provide significant utility and benefits. For example, automated particle classification, report generation, and/or the like may significantly reduce expert time and/or errors (such as typographical errors), thereby increasing efficiency and accuracy. At least some embodiments disclosed herein enable the full classification of each particle within a whole sample. Generally, technicians do not have enough time, nor are they required to, analyze every particle or the full sample for particle type or classification. Additionally, it can take a large amount of time for a technician to perform particle analysis and classification within a sample. This time can be saved by using machine learning algorithms and/or deep neural networks for automated computer or machine learning classification. Accuracy may be increased because a greater portion of the slide (or sample) is analyzed and because embodiments of machine learning algorithms or models may provide greater classification accuracy for a particle type and even for a larger number of different particle types.

Embodiments disclosed herein further allow for the long-term storage and use of samples because they are stored as digitized images and stored in a central location. Machine learning algorithms may be refined based on the large corpus of data and thus improved particle identification algorithms and machine learning results may be obtained. Error in report creation may also be decreased because typographical errors by humans may be reduced or eliminated. For example, even if a generated report is modified by a human user or technician after generation, the report details may reduce the chance of filling out a report with information from an incorrect sample, customer, location, or the like.

Furthermore, the tracking of the movement of the sample, digital images, associated health or location data, changes in particle classification, or the like may lead to quicker and more accurate reporting to clients. Additionally, more accurate tracking may lead to less management overhead and reduce the amount of time it takes to place a process in a final state so that a report and/or bill may be sent to a customer. Thus, a larger number of customers may be served, and even better identification and reporting results may be obtained.

In some cases, distinctions between different particles, or distinctions between different classifications of the same particle type may not be detectable visually for humans. Because existing classification methods for particles depend on human classification using the same channel as the human (e.g., visual detection/classification based on an image), existing systems and methods are unable to distinguish between particles that are indistinguishable to humans.

Numerous examples and embodiments disclosed herein include neural networks as a computer model for machine learning, training, and/or classification. Although neural networks may be used in at least some embodiments, one of skill in the art will recognize that other types of computer models, statistical models, or machine learning models may be used instead. Thus, neural networks are used as one example of a model and the disclosure is not limited to neural networks.

A detailed description of systems and methods consistent with embodiments of the present disclosure is provided below. While several embodiments are described, this disclosure is not limited to any one embodiment, but instead encompasses numerous alternatives, modifications, and equivalents. In addition, while numerous specific details are set forth in the following description to provide a thorough understanding of the embodiments disclosed herein, some embodiments may be practiced without some or all these details. Moreover, for the purpose of clarity, certain technical material that is known in the related art has not been described in detail to avoid unnecessarily obscuring the disclosure.

Referring now to the figures, FIG. 1 is a schematic diagram of a system 100 for image analysis that can be implemented for efficiently classifying images and explicitly classifying background image components. The system 100 includes an imaging platform 102 operated by an imaging server 104. The system 100 includes one or more personal devices 106 such as mobile phones, laptops, personal computers, tablets, microscopes, and so forth. The system 100 includes one or more cameras 108 which may include standalone cameras, cameras attached to a personal computing device such as a tablet or mobile phone, standalone image sensors, cameras attached to digital microscopy systems, cameras attached to endoscopic systems, and so forth. The system 100 further includes an image library 112 for storing past images, training datasets, and so forth. Each of the imaging server 104, the personal devices 106, and the cameras 108 is in communication with a network 110 such as the Internet.

The imaging platform 102 includes a user interface and logic for managing image datasets, test results, antibody test information, and so forth. The imaging platform 102 is operated by the imaging server 104, which is in communication with other entities and databases by way of Application Program Interfaces (APIs), Secure File Transfer Protocols (SFTP), or other connections by way of the network 110.

The personal devices 106 include any personal computing device that can communicate with the imaging server 104 by way of the network 110. The personal device 106 may include a smart phone, tablet, laptop, personal computer, and so forth. The personal devices 106 communicate with the imaging server 104 by way of a local area network (LAN), wide area network (WAN), or another network connection.

The personal devices 106 may comprise processing resources for executing instructions stored in non-transitory computer readable storage media. These instructions may be incorporated in an application stored locally to the personal device 106, an application accessible on a web browser, and so forth. The application enables a user to access the user interface for the imaging platform 102 to check test submissions, test results, upload files, verify whether files are accurately uploaded, receive feedback from the neural network 114, and so forth.

In an embodiment, a user accesses an account associated with the imaging platform 102 by way of the personal device 106. The user may be assigned a security role and location access to as many, or few, healthcare or laboratory locations as is required by the user's position. Security roles restrict what information and/or functionality the user can access. The imaging platform 102 may be accessible on a mobile phone application. The mobile phone application uses the camera and networking capabilities of the mobile phone to capture images and upload those images to the imaging server 104 and neural network 114 for analysis.

The camera 108 includes an image sensor with a pixel array configured for sensing reflected electromagnetic radiation for generating an image of a scene. The camera 108 may be integrated on the personal device 106, for example, the camera 108 may include one or more image sensors on a mobile phone that may communicate directly with an application stored on the mobile phone for capturing test images and providing the test images to the imaging server 104. The camera 108 may be integrated on a light microscopy system, endoscopic imaging device, or another imaging system. The camera 108 may include a standalone camera or image sensor such as a point-and-shoot camera, a mirrorless camera, a DSLR camera, a webcam, and so forth.

The image library 112 is a repository of test information, imaging datasets, and training datasets for the neural network 114. The imaging server 104 may access the image library 112 by way of an Application Program Interface (API) over the network 110 connection. The API allows the imaging server 104 to receive automatic updates from the image library 112 as needed. In an embodiment, the imaging library 112 is integrated on the image server 104 and is not independent of the storage and processing resources dedicated to the imaging server 104.

The image library 112 may include images and scans of slides that include biological matter to be assessed. The slides and other information may be received from a user, customer, technician, or other entity that has obtained and forwarded one or more samples. For example, a lab worker may receive the one or more slides and load the slides into a scanner for imaging. In one embodiment, the lab worker may scan a barcode on the slide that links the slide with other information about the slide (e.g., a customer, location, health symptoms, and sample type). The barcode may be used to automate where to look on the slide to locate the particulates from the sample. For example, the barcode may identify a manufacturer, customer, or party or entity that obtained the slide because the manufacturer, customer, or party or entity that obtained the slide may indicate where the sample is located. In some cases, it can be difficult to locate particulates on a slide, such as mold spores, if you do not know where the sample was placed on the slide. For example, the slide may be much larger than the actual sample, so it is often efficient to only scan/image the portion of the slide where the particulates are located. Knowing the entity, customer, or slide manufacturer (or brand) may allow a scanning system to automate location and scanning of the relevant portion of the slide.

Samples may be imaged using a wide range of different imaging techniques and at a wide range of different zoom levels. Example scanners or imagers that may be used include a digital microscope, bright-field microscope, polarized imager, phase contrast image, fluorescence imager, scanning electron microscope, dark-field microscope, or other types of scanners/imagers. During scanning or imaging of the sample, the scanner (such as a digital microscope) may be used to scan or image the whole area where the sample is located (e.g., where any particulates or other materials are located). These obtained images may be quite large in pixel count and memory size. For example, the images may be in full color (16-bit, 24-bit, 32-bit or more) with extremely high resolution (pixel count and/or dots per inch). In one embodiment, the imaging/scanning process obtains not only images of the whole area, but also images at different resolutions. For example, the sample area may be divided up into a grid of smaller sized areas, which are each imaged at a high zoom level and then multiple grid areas may be imaged together at a lower/wider zoom level. Different zoom levels may be helpful in imaging/identifying assorted sizes of particulates or detecting details for identifying different material types. For example, a single sample may include particles of varied sizes that would be helpful to detect and identify.

After imaging, the resulting digital images may be stored or associated with a serial number identifying the location where the sample was taken, a customer that obtained the image samples, or any other information about the location, sample, type, study type, medical conditions, or the like.

The digital images may be stored and transmitted to a cloud storage or remote storage location for training, analysis, classification, association, or aggregation with other data. For example, a lab may acquire the images and upload to a file server. The file server may include a listener that detects the uploading of new images and uploads those to a remote classification system for classification, storage, reporting, and/or sharing. Related data may also be uploaded with the image for storage at a remote or cloud location. Custody tracking of the sample, digitized images, and associated data may be provided to ensure security and accuracy of the data. In one embodiment, images, customer information, health information, or the like may be associated with a common serial number or other identifier so that correlations between various data can be determined.

Data stored in the remote or cloud storage, such as the image library 112, may include data, including images and related data, from many different labs, customers, locations, or the like. The stored data may be accessible to a classification system that includes a classification model, neural network, or other machine learning algorithm. The classification system may classify each image (or sample associated with the image) as including a particular type of particle. For example, the classification system may analyze each image to classify or detect particles within the images. A particle may be classified as a specific genus or species of mold spore, bacteria, virus, or other particle type.

The neural network 114 comprises storage and processing resources for executing a machine learning or artificial intelligence algorithm. The neural network 114 may include a deep learning convolutional neural network (CNN). The convolutional neural network is based on the shared weight architecture of convolution kernel or filters that slide along input features and provide translation equivalent responses known as feature maps. The neural network 114 may include one or more independent neural networks trained to implement different machine learning processes.

Figure 2:
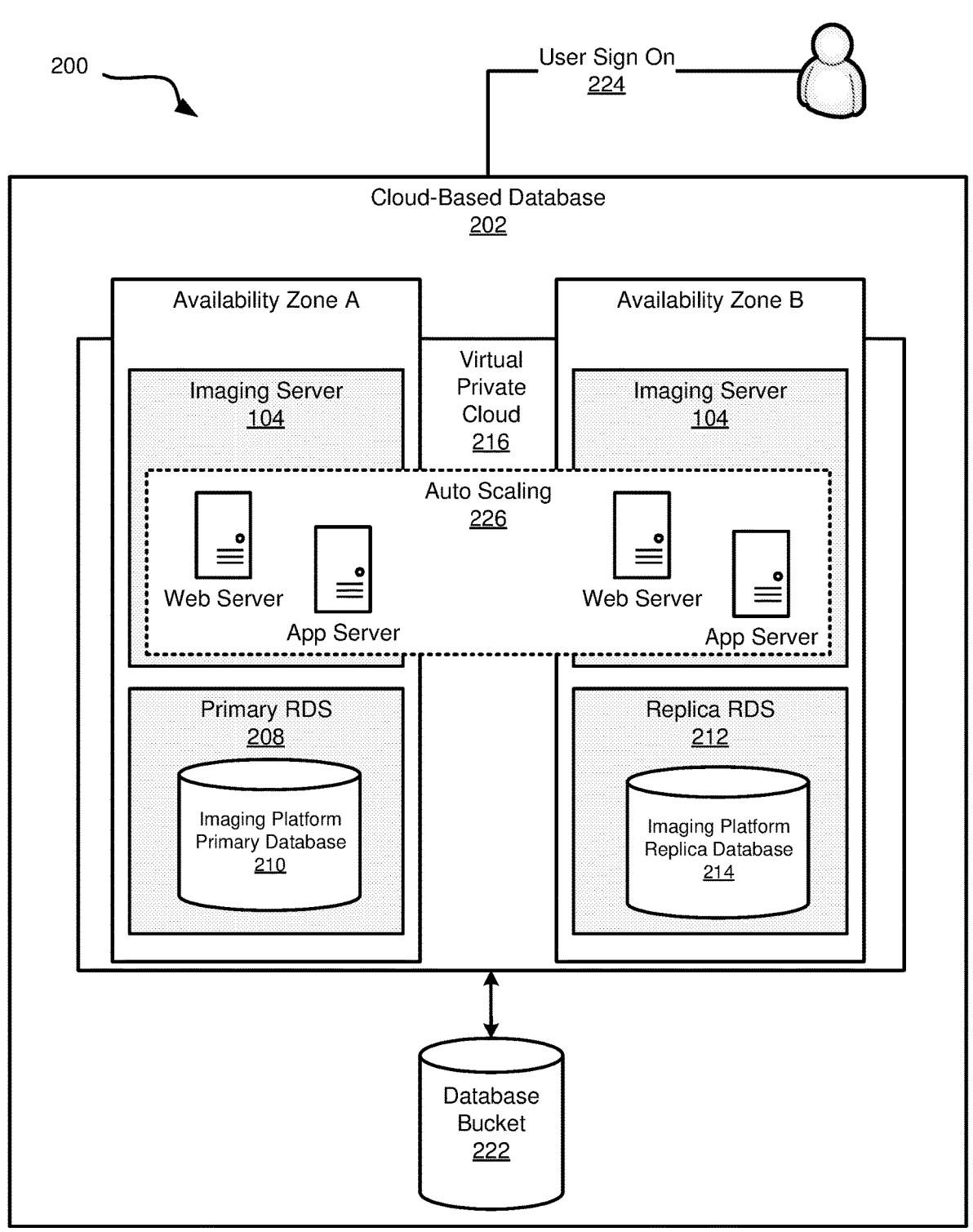
FIG. 2 is a schematic diagram of a system for data storage and analysis on a cloud-based storage system with fault-tolerant servers.

FIG. 2 is a schematic block diagram of a system 200 for imaging analysis and testing management. The system 200 illustrated in FIG. 2 may be implemented in conjunction with the system 100 illustrated in FIG. 1. The system 200 includes a cloud-based database 202 supporting the imaging server 104. The cloud-based database 202 includes an Availability Zone A and an Availability Zone B. The Availability Zone A includes a first instance of the imaging server 104 and the Availability Zone B includes another instance of the imaging server 104. Each of the instances of the imaging server 104 includes a web server and an app server, and the cloud-based database 202 auto-scales the processing and storage resources between the web servers and app servers for the Availability Zone A and the Availability Zone B. The Availability Zone A includes a primary relational database service (RDS) 208 and the Availability Zone B includes a replica relational database service 212. The imaging platform primary database 210 is stored on the primary relational database service 208 and the imaging platform replica database 214 is stored on the replica relational database service 212. The virtual private cloud 216 of the cloud-based database 202 communicates with outside parties by way of Application Program Interfaces 218 and Secure File Transfer Protocol (SFTP) 220 messaging. The cloud-based database 202 includes a database bucket 222 for storing information associated with the imaging platform 102. Users interacting the imaging platform 102 can sign on 224 to the service by communicating with the cloud-based database 202.

The cloud-based database 202 includes processing and storage resources in communication with the network 120. The cloud-based database 202 includes a resource manager for managing the usage of processing and storage resources. The resource manager of the cloud-based database 202 performs auto scaling 226 load balancing to ensure adequate processing and storage resources are available on demand based on real-time usage.

The availability zones represent discrete datacenters with redundant power, networking, and connectivity for supporting the imaging server 104. The availability zones enable the ability to operate production applications and databases in a more available, fault tolerant, and scalable way than would be possible with a single datacenter. The Availability Zone A and Availability Zone B are interconnected with high-bandwidth, low-latency networking, over fully redundant, dedicated metro fiber providing high-throughput, low-latency networking between the availability zones. All traffic between the availability zones is encrypted. The network performance of the availability zones is sufficient to accomplish synchronous replication between the availability zones. Applications, modules, components, and processing methods can be partitioned between the availability zones of the cloud-based database 202. When applications are partitioned across the availability zones, the imaging server 104 operates with increased protection and isolation from outages that may be caused by a low in power, hardware issues, software issues, and so forth. The availability zones are physically separated by a meaningful geographic distance to ensure the hardware supporting the availability zones will not be impacted by the same outside forces, such as power outages, natural disasters, and so forth.

The virtual private cloud 216 is an on-demand configurable pool of shared resources allocated within the cloud-based database 202. The virtual private cloud 216 provides isolation between different users communicating with the cloud-based database 202, e.g., different facilities, user accounts, and clients in communication with the imaging platform 102. The isolation between one virtual private cloud 216 user and all other users of the same cloud is achieved through allocation of a private IP subnet and a virtual communication construction such as a VLAN or a set of encrypted communication channels per user. The virtual private cloud 216 provides isolation between users within the cloud-based database 202 and is accompanied with a VPN function allocated per-user within the virtual private cloud 216. This secures the remote access to the imaging platform 102 by way of authentication and encryption. The imaging platform 102 is then essential run on a "virtually private" cloud, even if the processing and storage resources are provided by a third-party cloud-based database service, such as Amazon Web Services®.

The auto-scaling 226 is performed by a resource manager of the cloud-based database 202. The resource manager distributes workload between the web servers and the app servers of the various availability zones of the cloud-based database 202. In some cases, one client of the imaging platform 102 may consume a large quantity of storage resources and processing resources at a certain time, and the resource manager will allocate different web servers and app servers across the availability zones to ensure the client receives an adequate quantity of storage and processing resources. The auto-scaling 226 is performed in real-time to meet the needs of the imaging platform 102.

The primary and secondary relational database services 208, 212 provide a means to access, replicate, query, and write to the imaging platform database instances 210, 214. The imaging platform primary database 210 may include a copy of data associated with the imaging platform 102, such as user login information, user preference data, pharmaceutical inventory data, past purchasing data, current pricing data, pharmaceutical catalogue data, and so forth. The imaging platform replica database 214 may include a replica copy of all or some of the data stored on the imaging platform primary database 210. The replicated databases provide fault-tolerance and protect the imaging platform 102 form becoming inoperative during a power outage, hardware outage, or natural disaster.

The database bucket 222 provides object storage through a web service interface. The database bucket 222 uses scalable storage infrastructure that can be employed to store any type of object. The database bucket 222 may store applications, software code, backup and recovery, disaster recovery, data archives, data lakes for analytics, and hybrid cloud storage to support the imaging platform 102.

FIGS. 3-9 illustrate an image-by-image process flow for object detection and object classification. The process flow illustrated in FIGS. 3-9 may be referred to as a YOLO (You Only Look Once) machine learning model for object detection. The object detection pipeline utilizes YOLO to learn how to detect objects of interest given previously labelled objects the image processing algorithm has seen before. YOLO views the images as an SxS grid. Each grid cell learns to predict whether an objects exists within its cell, and if there is an object, the image processing algorithm defines a bounding box around the object and classifies the object.

The YOLO model depicted in FIGS. 3-9 is trained using images with boxed and labeled objects. These training images are fully classified, meaning that each object of interest within the image has been boxed and labeled. With a quality dataset, the image processing algorithm learns to proficiently box and classify objects after looking at scenes a sufficient quantity of times. The most efficient way to improve the image processing algorithm is to label additional data (i.e., provide additional training images) or clean the existing dataset. Any misclassified or improperly boxed objects present within the training dataset will decrease the performance of the image processing algorithm.

Figure 3:
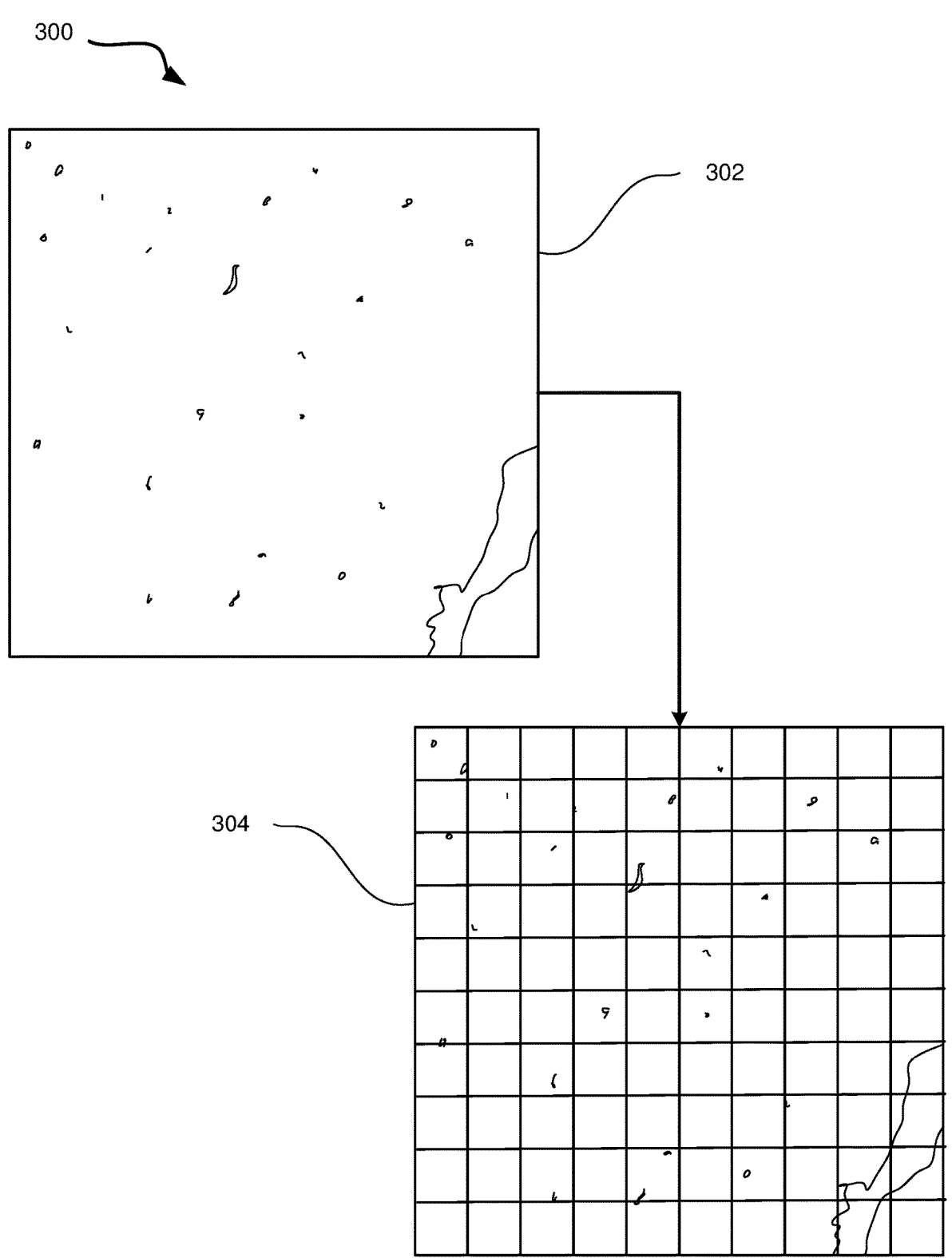
FIG. 3 is a schematic illustration of an input image that is partitioned into a plurality of grid units.

FIG. 3 is a schematic illustration of an example image for classification. As shown in FIG. 3, the input image 302 is partitioned into a plurality of grids to generate the grid overlay image 304. The grid overlay image 304 is then processed with a machine learning algorithm (such as the neural network 114) to identify, box, and classify the objects within the input image 302.

The example input image 302 utilized in FIGS. 3-9 is a microscopy view of biological material such as viruses, bacteria, mold spores, cells, and so forth, which can be challenging to classify with a machine learning algorithm. Typical slide images include diverse types of cells or other objects of interest with different class types. Most cell types correspond to a kind of cell, parasite, or bacteria, but may include other kinds of objects. Microscope images typically include occluded image data, out-of-focus regions, mislabeled objects, and can be very dense with numerous types of objects close to one another. In some cases, images depicting biological material are analyzed to identify and quantify the presence of rare cells such as specific viruses, bacteria, fungi, and so forth. In many cases, an image of a slide will include a few instances of rare cells and will include many more instances of "background" cells that are not being identified.

The input image 302 is captured by an image sensor and may specifically be captured by an image sensor associated with a microscope or other device used for magnification. The input image 302 may include a down sampled (lower resolution) version of an original image or it may be a cropped portion of the original image. The input image 302 may include the original, full-resolution capture.

In some cases, a slide scan includes more detail than needs to be classified. In these cases, the slide scan may be cropped to a classification region, and this classification region is then fed as the input image 302. The classification region is typically drawn by a user that manually specifies which area should be classified. Classification regions supersede any zone classifiers that attempt to determine what part of the scan should be classified. If a scan has no classification region, the entire scan is fed in the image processing algorithm as the input image 302. A classification region may be as small as a 1×1 pixel box.

Classification regions have an optional filter that specifies only specific classes to be uploaded to the image processing algorithm. If there are overlapping filtered classification regions, the overlapped area will return objects that match either of the two filters.

If there is a classification region on the slide scan, then all foreground class and anti-class ground truth labels outside of the classification region will be considered inferred classification regions, which means the classifier (typically a user) should attempt to classify that label as if a filtered classification region the same size as the label were present. That is, no false positives will be identified for objects that intersect the ground truth label. Objects inside a filtered classification region that do not match the filter are considered an inferred classification region and therefore follow the overlap rules described herein.

Proposed objects that are both wholly within a classification region and do not have a ground truth match will be uploaded and counted as a false positive. Proposed boxes that have a matching ground truth will be uploaded and counted in the metrics. Proposed boxes that are now wholly contained in a classification region and do not match a ground truth will not be uploaded or counted.

The input image 302 is partitioned with a grid to generate the grid overlay image 304. In the example illustrated in FIG. 3, the input image 302 comprises a depiction of a plurality of particles, which may include, for example, mold spores, bacteria, viruses, cells, fibers, non-organic matter, and so forth. The grid overlay image 304 includes the input image 302 with a grid overlaid thereon. The grid may include a plurality of squares as illustrated in FIG. 3, or it may include other shapes, as necessary. Additionally, the grid may include an equal number of squares along an x-axis when compared with the number of squares along the y-axis. Alternatively, the grid may include a non-equal number of squares along the x- and y-axes. The grid is overlaid on the input image 302 such that the particles depicted in the input image 302 are located within one or more grid squares.

Figure 4:
FIG. 4 is a schematic illustration of a grid overlay image comprising a plurality of grid units.

FIG. 4 is a schematic illustration of the grid overlay image 304. The grid overlay image 304 may be partitioned such that each grid unit (the squares in the example illustrated in FIG. 4) is identifiable with a unique name. For example, the grid units across the top row may be named A1, A2, A3, A4, A5, A6, A7, A8, A9, and A10, and the grid units across the second row may be named B1, B2, B3, B4, B5, B6, B7, B8, B9, and B10, and so forth. The plurality of square grids within the grid overlay image 304 may be preferrable to simplify the grid overlay and simply the naming of each grid unit. However, it should be appreciated that other grid geometries may be used without departing from the scope of the disclosure.

Figure 5:
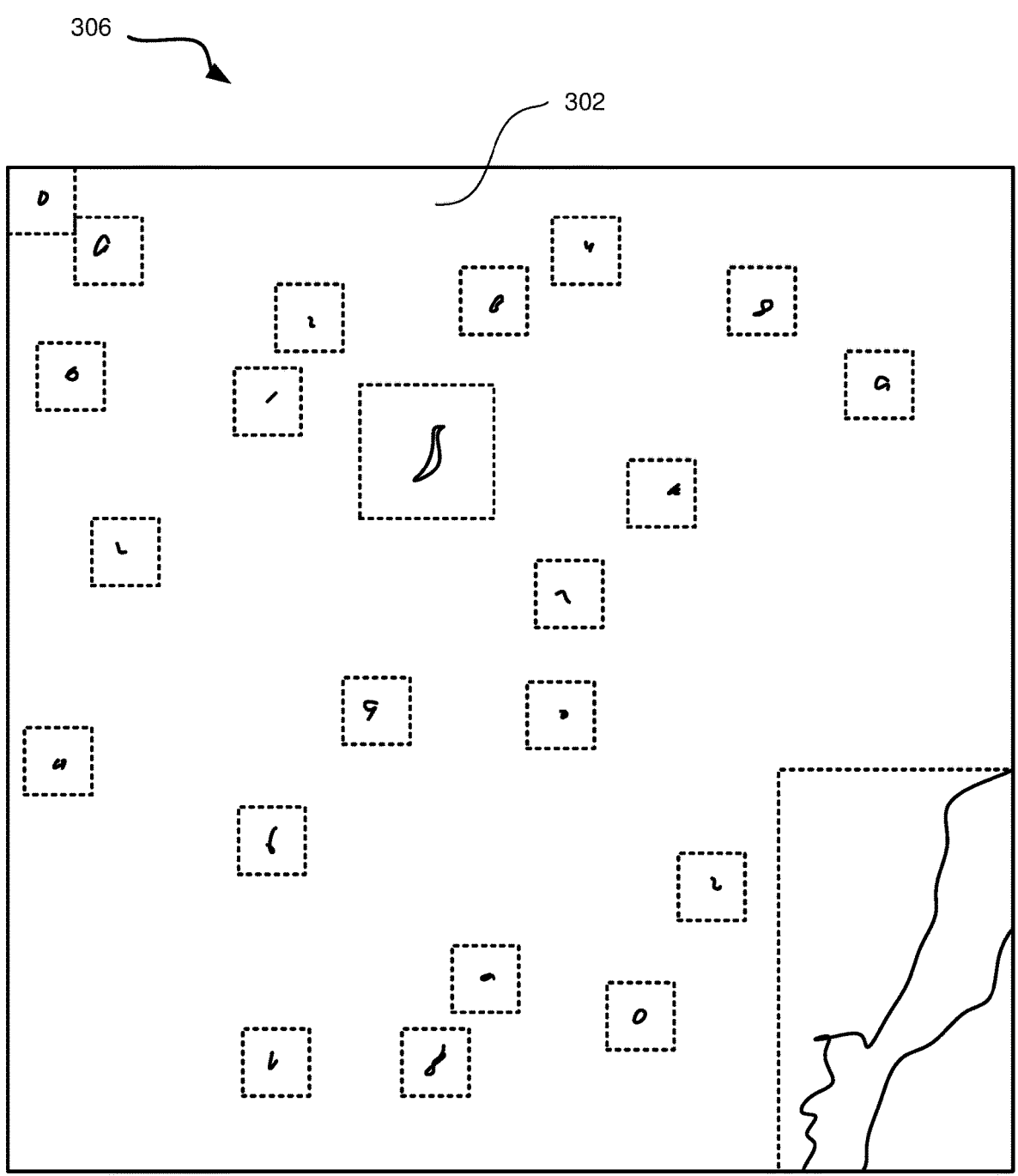
FIG. 5 is a schematic illustration of an input image comprising a plurality of objects of interest, wherein each of the plurality of objects of interest is identified with a box label.

FIG. 5 is a schematic illustration of the input image 302 with anchor boxes around each particle to generate an anchor box image 306. In some cases, the systems, methods, and devices described herein do not generate a complete anchor box image 306 and instead place anchor boxes around only a selection of particles within the input image 302.

The image processing algorithm is trained on a training dataset that classifies objects into one or more classifications according to a labeling protocol. The labeling protocol includes one or more of a (i) foreground classification; (ii) anti-class classification; (iii) background classification; (iv) exclude classification; (v) merge classification; and (vi) ignore classification. During training, the image processing algorithm maps classifications to cell type categories such that each classification may be treated differently for each training run.

In the training dataset and during model classification, foreground objects include objects of interest that the image processing algorithm must accurately detect to assist a pathologist or technician in making a slide-level determination. The goal is to detect foreground objects consistently and precisely and then upload those detections and counts for review.

Typically, foreground objects must be smaller than the size of the scene. If the scene includes large objects for classification, the recommended approach is to only a box a portion of the large object. For example, the image processing algorithm may box the head of a work or the nucleus of a large cell. As with all foreground objects, the image processing algorithm defines a means to consistently box them. If there is more than one way to box the subsection of the object, the image processing algorithm will experience issues when defining an object-level holdout, and this will create interference with training the image processing algorithm.

When adding a background class is not enough to weed out visually similar objects from detected as foreground, the image processing algorithm may classify a background as an anti-class. This explicitly forces the image processing algorithm to learn to separate the foreground class from its confusion pair background class. For the purposes of training, anti-class objects are treated as foreground objects except they are treated as background for reporting. Anti-class proposals at classify time are either configured as an expert-only cell type and uploaded, or are not uploaded at all depending on debug, database, and customer needs. Anti-class proposals found at object level holdout time may be uploaded if they match ground truth boxes, and not if they are classified as false positives. Typically, anti-classes have the same size constraints discussed in connection with foreground classes.

The image processing algorithm is trained not to predict boxes on background areas of each scene. This is accomplished by adding background boxes. When the image processing algorithm sees a background box it learns to not predict boxes at that location. Background boxes inhibit box prediction while foreground boxes encourage box predictions. Anything within a background box that is foreground must be classified or excluded.

The image processing algorithm may further be trained to generate exclude boxes. Exclude boxes override background, foreground, and classification region objects. During training, if an exclude box contains the center of a foreground box, then the foreground box is treated as if it does not exist. Further, if a background box overlaps with an exclude box, then only the overlapping region of the background box is ignored. Exclude objects are segmented into intuitive classes. For example, blurry foreground objects should be in one exclude class, while foreground objects whose classification is not known should go into another exclude class.

Boxes in training that are not verified may be treated as exclude boxes because they represent an elevated risk to be something of interest, and therefore potentially mislabeled. Further, unverified labels are intended to be a temporary state until an expert (human) has a chance to verify the label so it is not expected that there will be an overabundance of unverified boxes causing issues when training the image processing algorithm.

The configuration file for training the image processing algorithm has fields to specify background classes, ignore classes, and exclude classes. Any other cell type contained in the classmap automatically becomes foreground if it has some minimum number of boxes.

Objects that match an excluded object from a ground truth are removed from the metrics output by the image processing algorithm. Objects that are fully contained within an excluded region are also removed from the metrics.

Classes can be combined before or after they are presented to the image processing algorithm, depending on the desired effect. To implement a pre-model merge, multiple cell types can be merged into one model class. This is common when the differentiation is not important but combining classes improves accuracy. This may also be useful when there are several variations of a classification, and each should be split to ensure it receives proper representation. For example, schistocytes in blood have many variations including "small fragment" and "helmet." To ensure the image processing algorithm has adequate coverage for both variations, they may be labeled separately in the training dataset, and then merged together before the training dataset is provided to the image processing algorithm.

Multiple model types may be combined into one cell type. This may be helpful if there are distinct types of objects that each count toward the same final object type. The image processing algorithm can learn each object type separately and then combine the results.

The training dataset may additionally include ignored classes. This may occur when objects are labeled but are not wanted in the training dataset or holdout. These ignored objects should be treated as if they do not exist. A common example of this is to do a brief experiment to exclude a class to measure its impact. Configuring a class to be an ignored class is a simplified means to facilitate this. In a comparison view, ignored objects within the holdout are treated as if they do not exist, and thus they have no bearing on the comparison view.

Figure 6:
FIG. 6 is a schematic illustration of an input image comprising a plurality of objects of interest each surrounded by a box label, and wherein the input image is partitioned into a plurality of grid units.

FIG. 6 is a schematic illustration of grid overlay image 304 comprising anchor boxes around particles within the image. The input image 302 is fed to a neural network (may specifically be a Convolutional Neural Network) that is configured to analyze the input image 302 grid-unit-by-grid-unit such that the neural network individually assesses each grid unit within the grid overlay image 304. The neural network will perform each individual assessment based on the image as a whole, rather than only the image data located within a particular grid unit.

For example, the neural network first analyzes grid unit A1 to determine the following: (a) an x-coordinate for grid unit A1; (b) a y-coordinate for grid unit A1; (c) a width of grid unit A1; (d) a height of grid unit A1; (e) a determination of whether grid unit A1 includes an object of interest. The neural network is trained to identify and classify certain objects of interest and may be trained to ignore other objects within the image. In an example implementation, the neural network is trained to classify microscopy slides, and the neural network is trained to disregard common particles. The neural network may be trained to identify and classify only certain rare particles that may be present within the input image.

The neural network continues to analyze every grid unit within the grid overlay image 304 to determine the x-coordinate, y-coordinate, width, height, and determination of whether the grid unit includes an object of interest. The neural network performs the per-grid unit analysis based on the image as a whole, rather than only analyzing the image data within the grid unit that is currently being analyzed. The loss function only is applied to grid units that overlap with ground truth labels by a configurable percentage. All other grids units are ignored by the loss function which means the image processing algorithm does not learn from those areas of the scene. This allows labelers to exclude areas of the scene that contain ambiguous or overly numerous objects thereby creating a higher quality data set.

The neural network performs the following loss functions only on each grid unit with either a background or foreground label within the grid overlay image 304.

$$\lambda_{coord} \sum_{i=0}^{S^2} \sum_{j=0}^{B} 1_{ij}^{obj} \left[ (x_i - \hat{x}_i)^2 + (y_i - \hat{y}_i)^2 \right]$$

The variable S refers to each grid unit within the grid overlay image 304. The variable $x_i$ refers to the ground truth x-coordinate location for the grid unit, and this is compared with the proposed x-coordinate location $\hat{x}_i$. The same is performed for the ground truth y-coordinate location $y_i$ and the proposed y-coordinated location $\hat{y}_i$. If the neural network is incorrect, then the equation will generate some loss that will feed into back propagation.

$$+\lambda_{coord}\sum_{i=0}^{S^2}\sum_{j=0}^{B}1\frac{obj}{ij}\left[\left(\sqrt{w_i}-\sqrt{\hat{w}_i}\right)^2+\left(\sqrt{h_i}-\sqrt{\hat{h}_i}\right)^2\right]$$

Again, this function is performed only on every grid unit with either a background or foreground label within the grid overlay image 304. This equation is performed on the ground truth width $w_i$ and proposed width $\hat{w}_i$, and further on the ground truth height $h_i$ and proposed height $\hat{h}_i$. If the neural network is incorrect, then the equation will generate some loss that will feed into back propagation.

$$+\sum_{i=0}^{S^2}\sum_{j=0}^{B}1\frac{obj}{ij}(c_i-\hat{c}_i)^2$$

Again, this function is performed only on every grid unit with a foreground label within the grid overlay image 304. This equation determines whether the grid unit contains the center of the foreground label, or not. The variable c is the confidence that the grid unit comprises an object of interest. If the grid unit comprises an object, then the confidence score should be equal to one. If the neural network is incorrect, and the confidence score is less than one when the grid unit comprises an object, then the loss function will penalize the image processing algorithm for this error. If the grid unit does not comprise an object, then the confidence score should be equal to zero. If the neural network is incorrect, and the confidence score is greater than zero, then the loss function will penalize the image processing algorithm for this error.

$$+\lambda_{no\ obj}\sum_{i=0}^{S^2}\sum_{j=0}^{B}1\frac{no\ obj}{ij}(c_i-\hat{c}_i)^2$$

Again, this function is performed only on every grid unit with a foreground or background label within the grid overlay image 304. This function compensates for the prior loss function to reduce the likelihood that the neural network will incorrectly indicate that a grid unit does not comprise an object. For every grid unit, if the grid unit is not the best-fitting anchor box that contains the center of a foreground label, then the neural network will learn to get close to a confidence level equal to zero. The neural network may likely assess many more grid units that do not comprise an object of interest than it will assess grid units that do comprise an object of interest. This may lead the neural network to be increasingly conservative and prone to indicating that a grid unit does not include an object of interest. The above function compensates for this tendency and is performed for cases when the grid unit does not include an object of interest (no obj).

$$+\sum_{i=0}^{S^2}1\frac{obj}{ij}\sum_{c\ classes}(p_i(c)-\hat{p}_i(c))^2$$

This function is performed to determine when the neural network correctly classified the grid unit with a foreground label. When the neural network correctly classifies a grid unit that comprises an anchor box, then the function will result in no loss.

Figure 7:
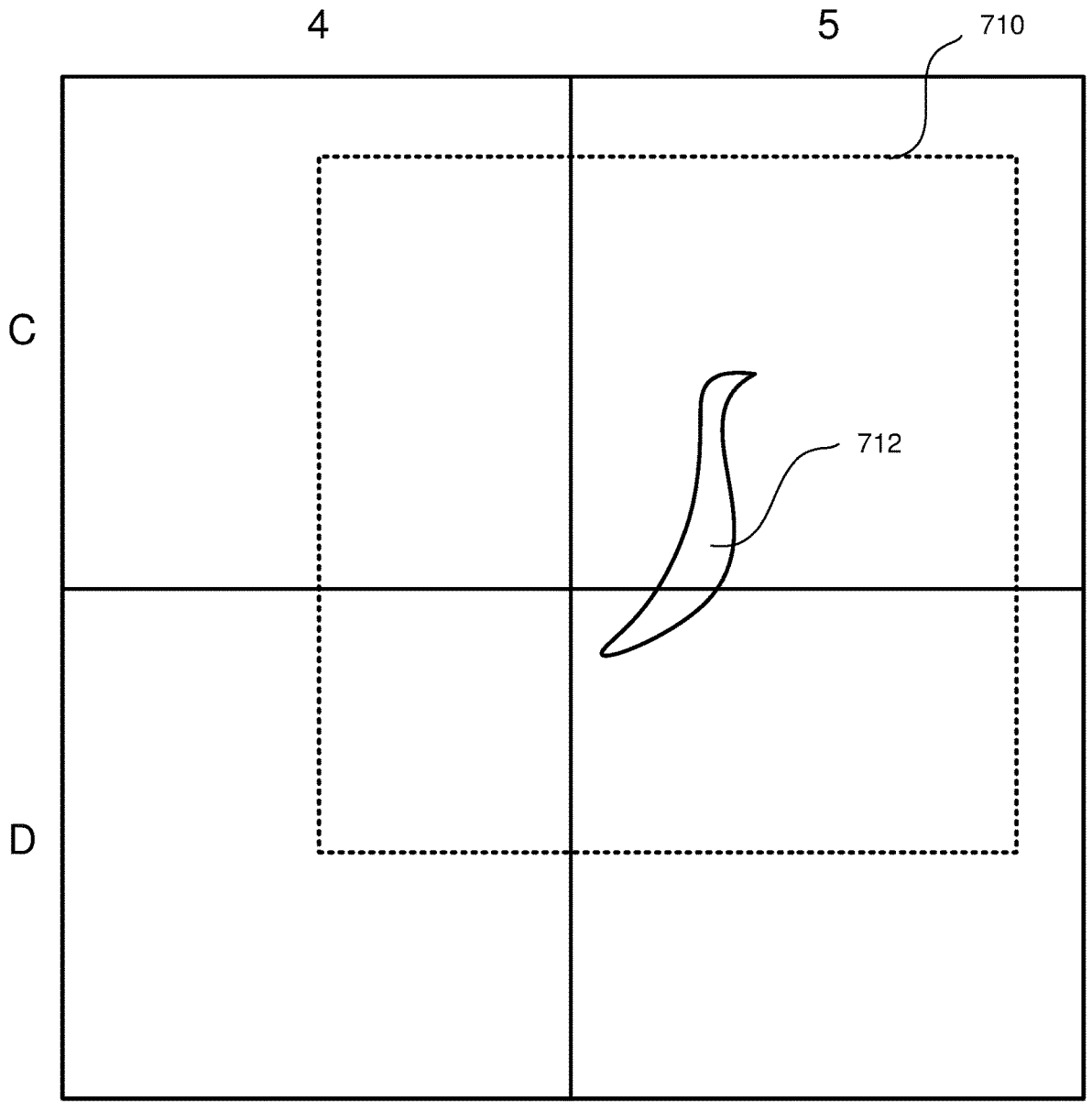
FIG. 7 is a schematic illustration of a plurality of grid units that each comprise a portion of a box label associated with an object of interest.

FIG. 7 is a schematic illustration of a particle 712 that is selected for analysis and classification. The particle 712 illustrated in FIG. 7 is the same particle illustrated in FIG. 6 that comprises an anchor box 710 touching each of grid units C4, C5, D4, and D5. The particle 712 itself is located within grid units C5 and D5, while the anchor box around the particle touches each of grid units C4, C5, D4, and D5. The neural network determines that each of C4, C5, D4, and D5 should comprise a portion of the anchor box 710 drawn around the particle 712.

Figure 8:
FIG. 8 is a schematic illustration of an object of interest surrounded by a box label, wherein a center point of the box label is identified.

FIG. 8 is a schematic illustration of the particle 712 also illustrated in FIG. 7. The particle now comprises a center point 714 that denotes the center of the anchor box 710. The center point 714 is located within grid unit C5. For purposes of understanding, grid unit C5 is shaded in FIG. 8 to further indicate that the center point 714 of the anchor box 710 for the particle 712 is located within grid unit C5.

The machine learning algorithm described herein is performed on each grid unit C4, C5, D4, and D5 associated with the particle 712. The machine learning algorithm comprises identifying the center point 714 of the anchor box and then determining which grid unit comprises the center point 714. The machine learning algorithm affirmatively indicates that each of the other grid units (C4, D4, and D5) does not include the center point 714 of the particle 712.

Figure 9:
FIG. 9 is a schematic illustration of a grid unit that comprises the center point of a box label that is associated with an object of interest.
Figure 9:
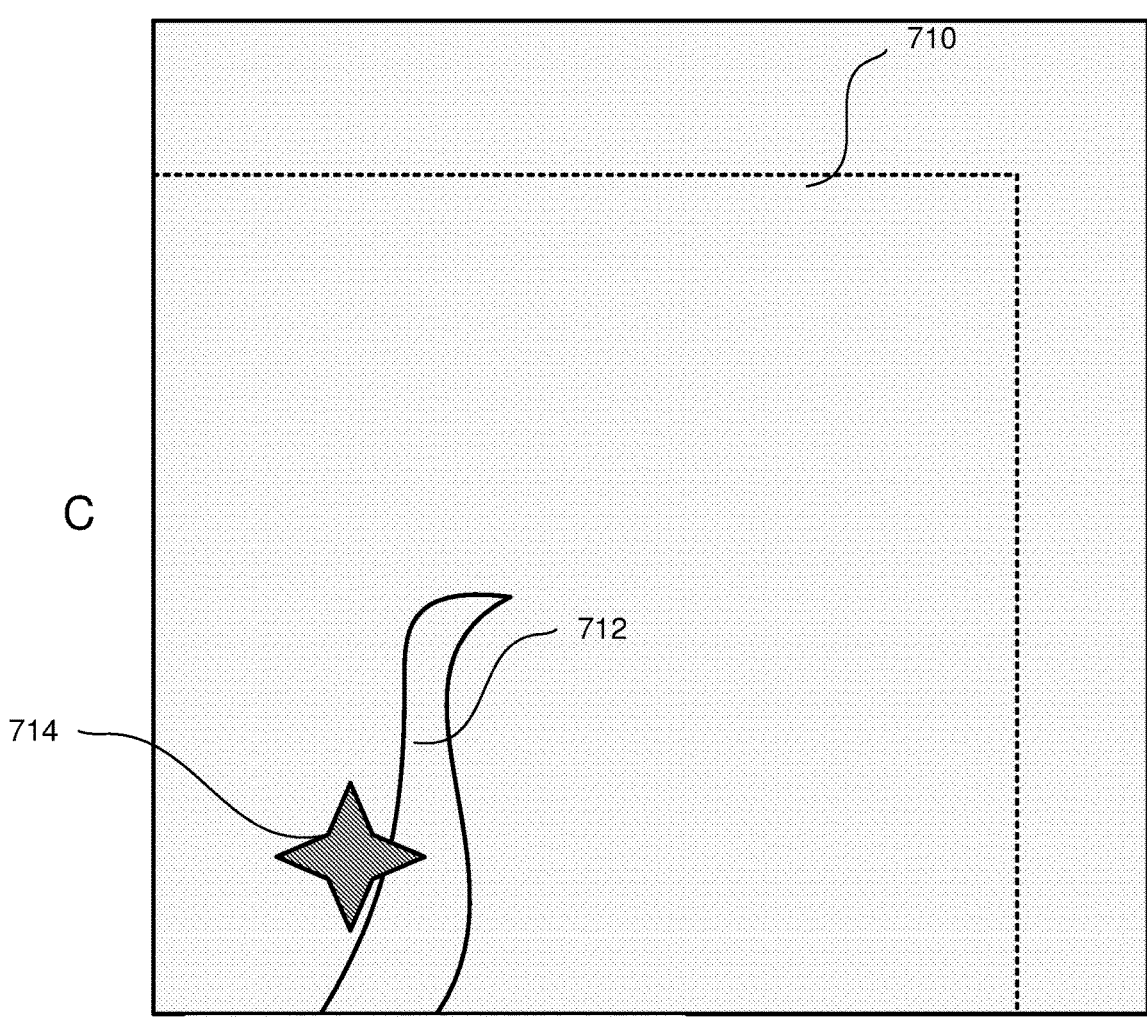

FIG. 9 is a schematic illustration of grid unit C5, including the portion of the particle 712 and the portion of the anchor box 714 that are located within grid unit C5.

As shown in FIGS. 3-9, classification is accomplished by dividing the input image 302 (i.e., the "classification region" of a slide scan or the entire slide scan) into P×Q "tiles." Each of the tiles is sent to the image processing algorithm. The YOLO model predicts bounding boxes (see FIG. 5) and their classifications.

During classification, attributes allow for differentiating various groups within a cell type. An attribute could describe a certain kind of variation, or it could describe how in focus the cell is. Multiple attributes can help further describe an image beyond just its cell type. For example, a prominent use-case is with the VetFecal vertical, wherein each cell type has two attributes: "NonExemplar" and "Exclude." For each foreground cell type, images that may not be completely in focus or partially obscured by another object are marked NonExemplar. Excluded images have something visible wrong with the object, for example, the object is cracked or otherwise undesirable. By labelling these images as Exclude, the image processing algorithm will not propose new boxes around that object in the future but will also not learn from it. In this use-case, exemplary "Exemplar" images are not marked with either of these attributes. For VetFecal, using only exemplary images enabled the image processing algorithm to obtain sufficient precise/recall with few images.

Figure 10:
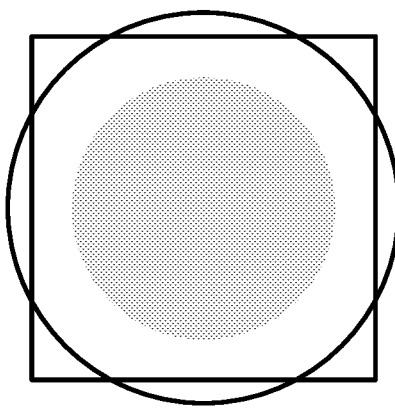
FIG. 10 is a schematic illustration of a training model for training a neural network to train a box label around an object of interest.
Figure 10:
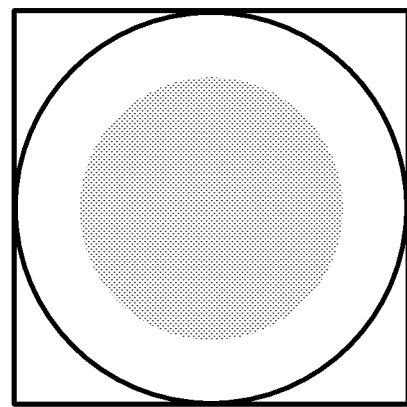
Figure 10:
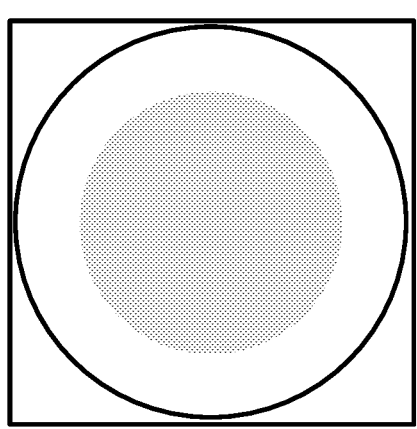
Figure 10:
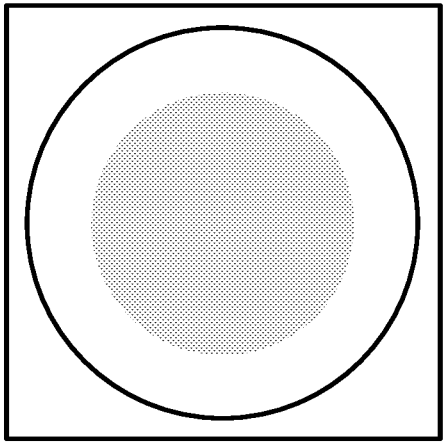

FIG. 10 illustrates instructions for labelers (human labelers or the image processing algorithm) to draw boxes around foreground objects. A one-pixel margin allows the labeler to quickly draw a consistent box because they can see the 1-pixel margin between the object and the box. An inconsistent margin around foreground objects creates noisy loss because the loss function penalizes any variation between the proposal and the label. This penalty is just noise that does not improve model performance and can make debugging more complicated.

Figure 11:
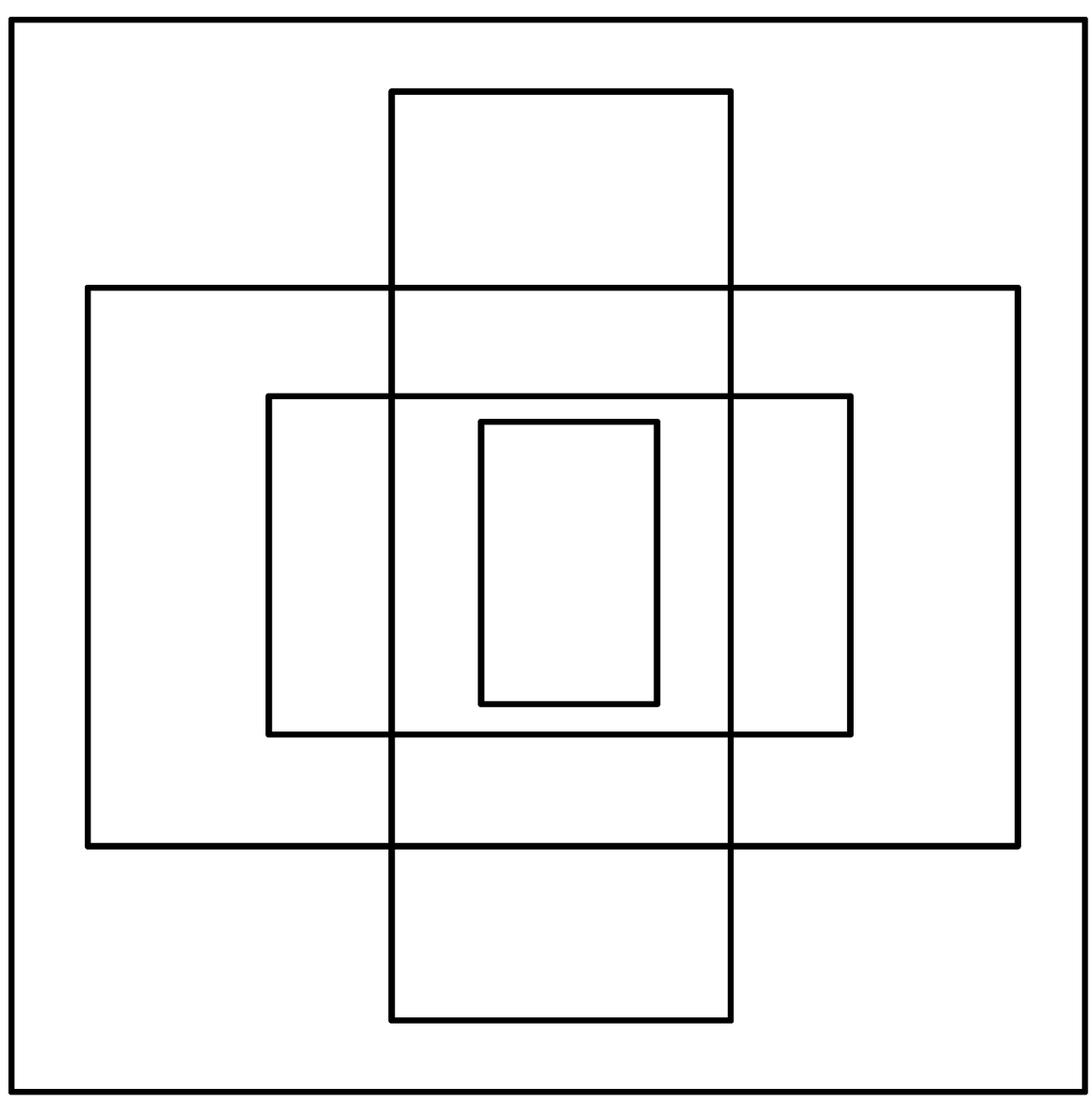
FIG. 11 is a schematic illustration of potential dimensions and shapes for anchor boxes.

FIG. 11 illustrates potential anchor boxes that may be placed on various objects and particles within an image. The dimensions and shapes of the anchor boxes are selected based on the shape of the object or particle being classified. The anchor boxes serve as a starting point for the machine learning algorithm to identify an object or particle for classification prior to the actual classification of the object or particle. In various embodiments, a plurality of anchor boxes may be placed around a single object or particle. The shapes of the one or more anchor boxes are selected based on the object or particle being classified. Additionally, the dimensions of the one or more anchor boxes are adjusted and optimized to match the shape of the object or particle being classified, as further illustrated in FIG. 12.

Figure 12:
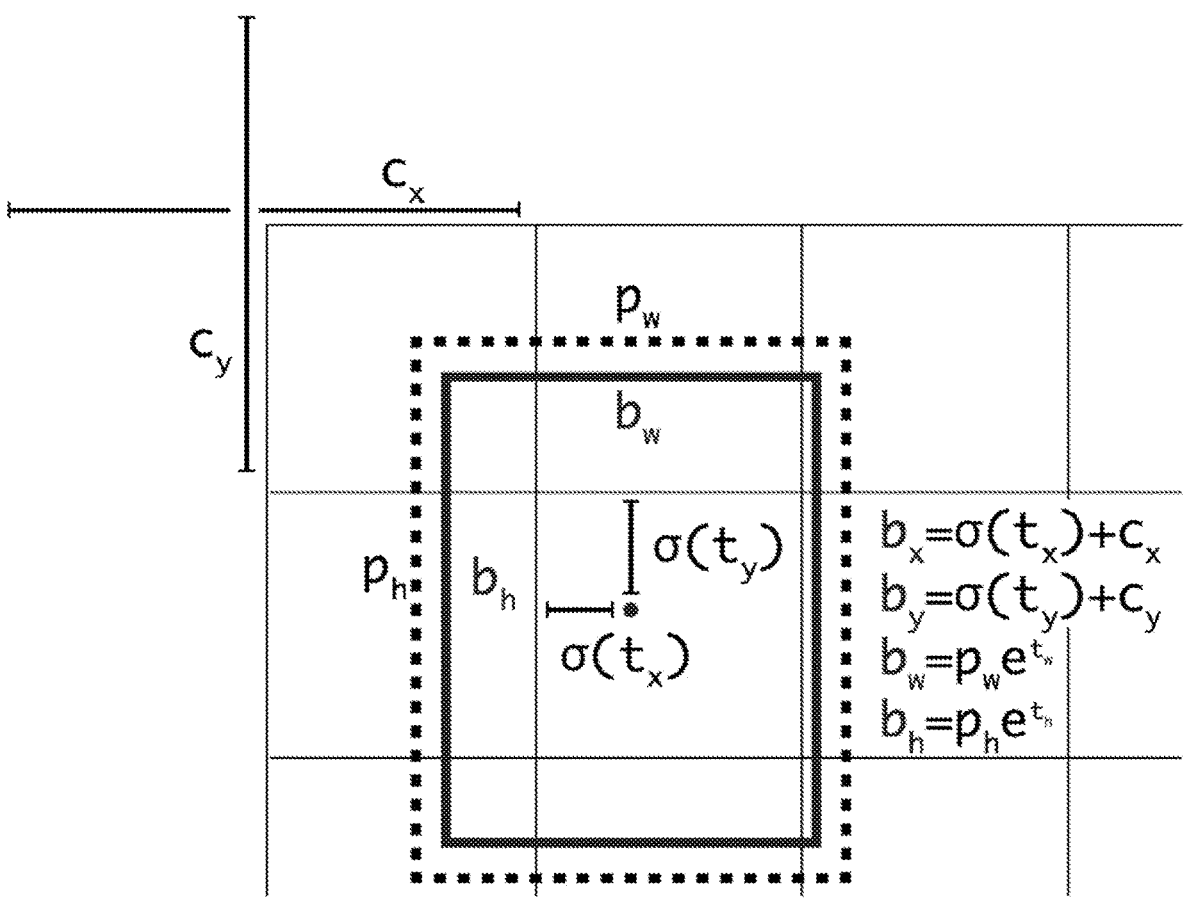
FIG. 12 is a schematic illustration of learned offsets implemented by a neural network.

FIG. 12 illustrates a schematic diagram of a process for altering and optimizing the dimensions and shape of an anchor box around an object or particle within an image to generate a proposal box. The neural network first places an anchor box around an object, and then the neural network learns and implements offsets to optimize the dimensions of the anchor box around the object, as shown in FIG. 12.

Each grid unit within the input image 302 is fed into a neural network (may specifically be a Convolutional Neural Network). The neural network processes each grid unit and proposes an x-coordinate, y-coordinate, width, height, and indication of whether the grid unit likely includes an object. The neural network may propose this information in the following format: [x, y, w, h, o].

In an example implementation, the neural network is trained to identify and classify a specific bacterium, and is further trained to disregard all other cells, viruses, bacteria, mold spores, fibers, and so forth. In this implementation, the neural network may determine that a certain grid unit includes a cell but does not include the specific bacteria that the neural network is searching for. In this case, the neural network would classify that certain grid unit as not including an object, because that grid unit does not include the specific bacteria that is being identified and classified.

When the neural network determines that a certain grid unit does not include an object of interest, then that grid unit may be explicitly labeled as "background." The explicit background grid units may be used to train the neural network and may be processed by the neural network.

The neural network learns offsets for every object classification. The anchor box illustrated in FIG. 12 is adjusted by the neural network according to a plurality of offsets. The shape and dimensions of each side of the rectangle may be adjusted based on the learned offsets. The neural network learns box and offsets for every classification, and the neural network specializes the anchor box for each classification.

Figure 13:
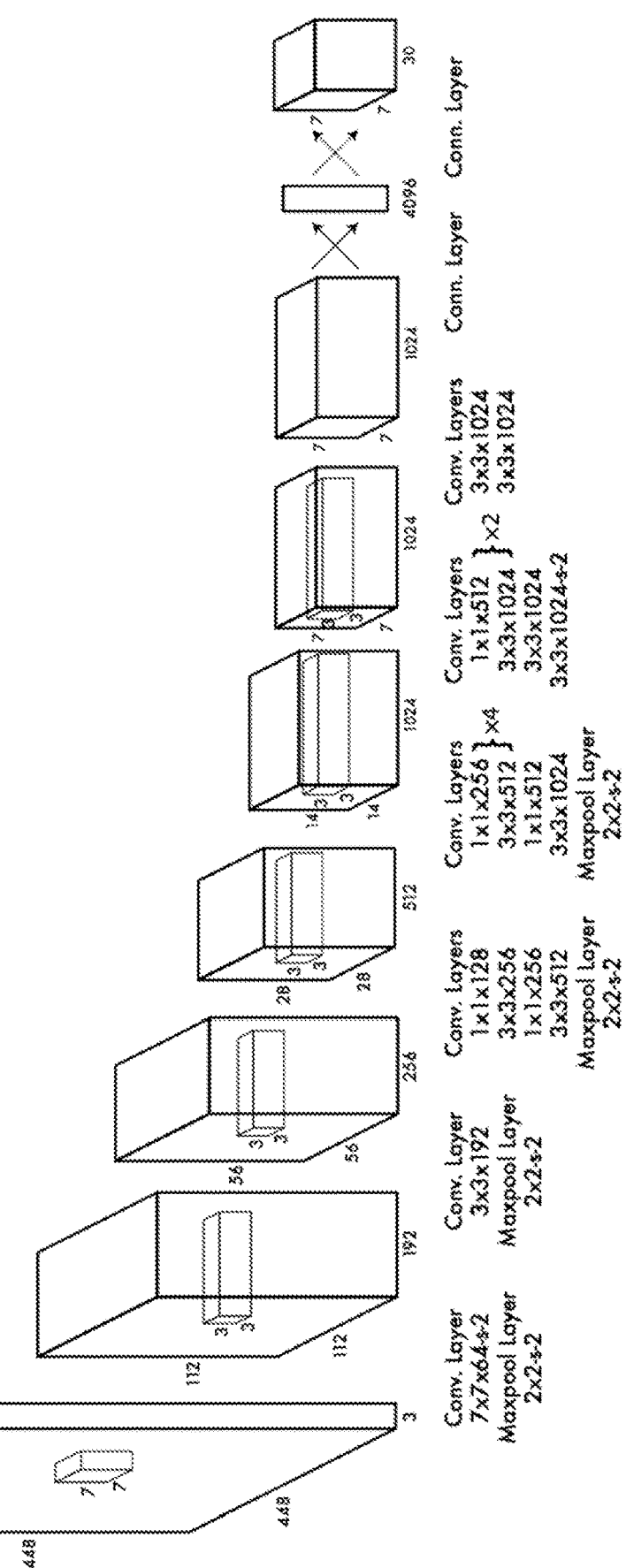
FIG. 13 is a schematic illustration of a convolutional neural network.

FIG. 13 is a schematic diagram of a convolutional neural network. The systems, methods, and processes for image classification that are described herein may be performed with a convolutional neural network such as the one illustrated in FIG. 13.

Figure 14:
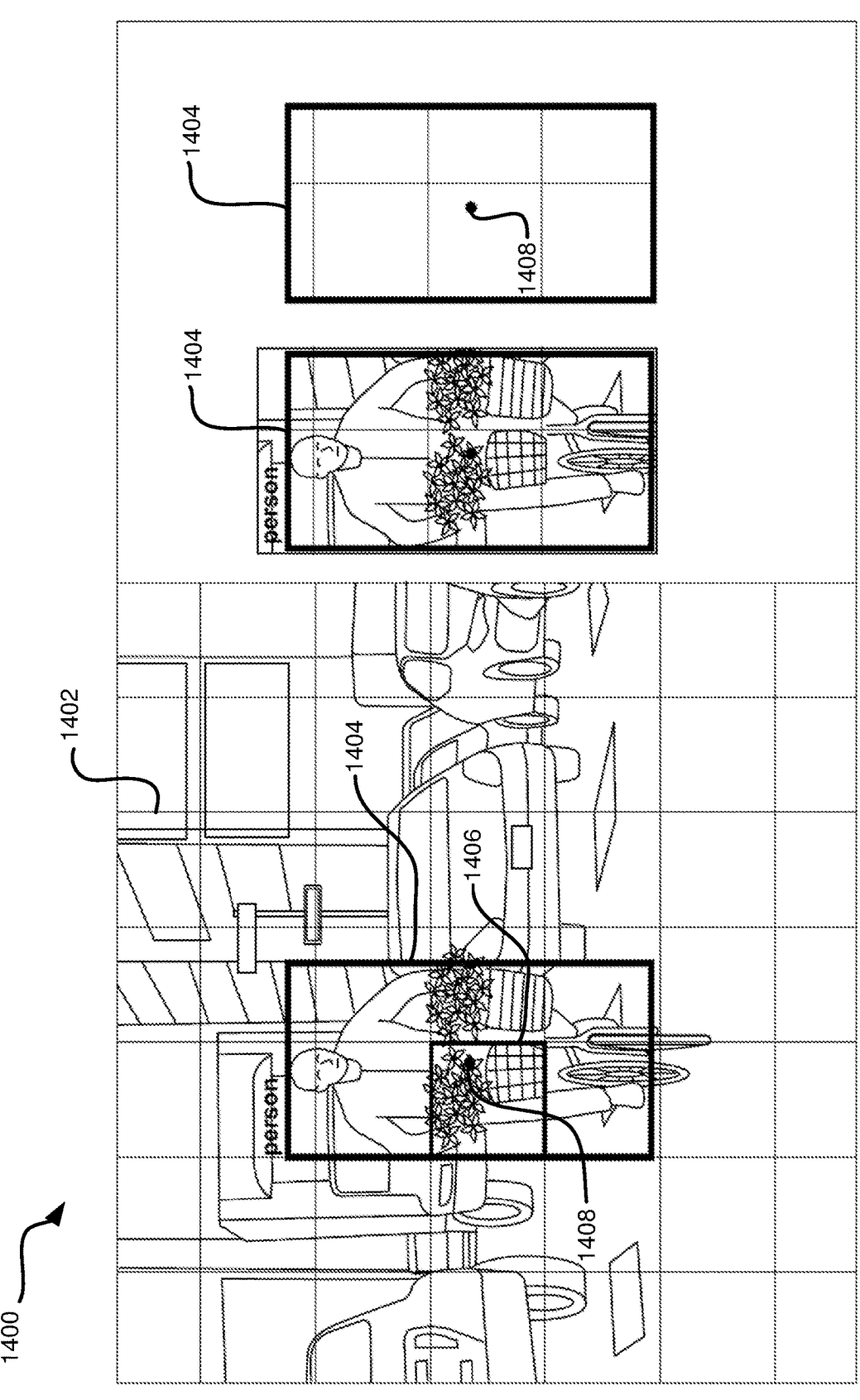
FIG. 14 illustrates an example implementation of a model for identifying and classifying objects of interest.
Figure 15:
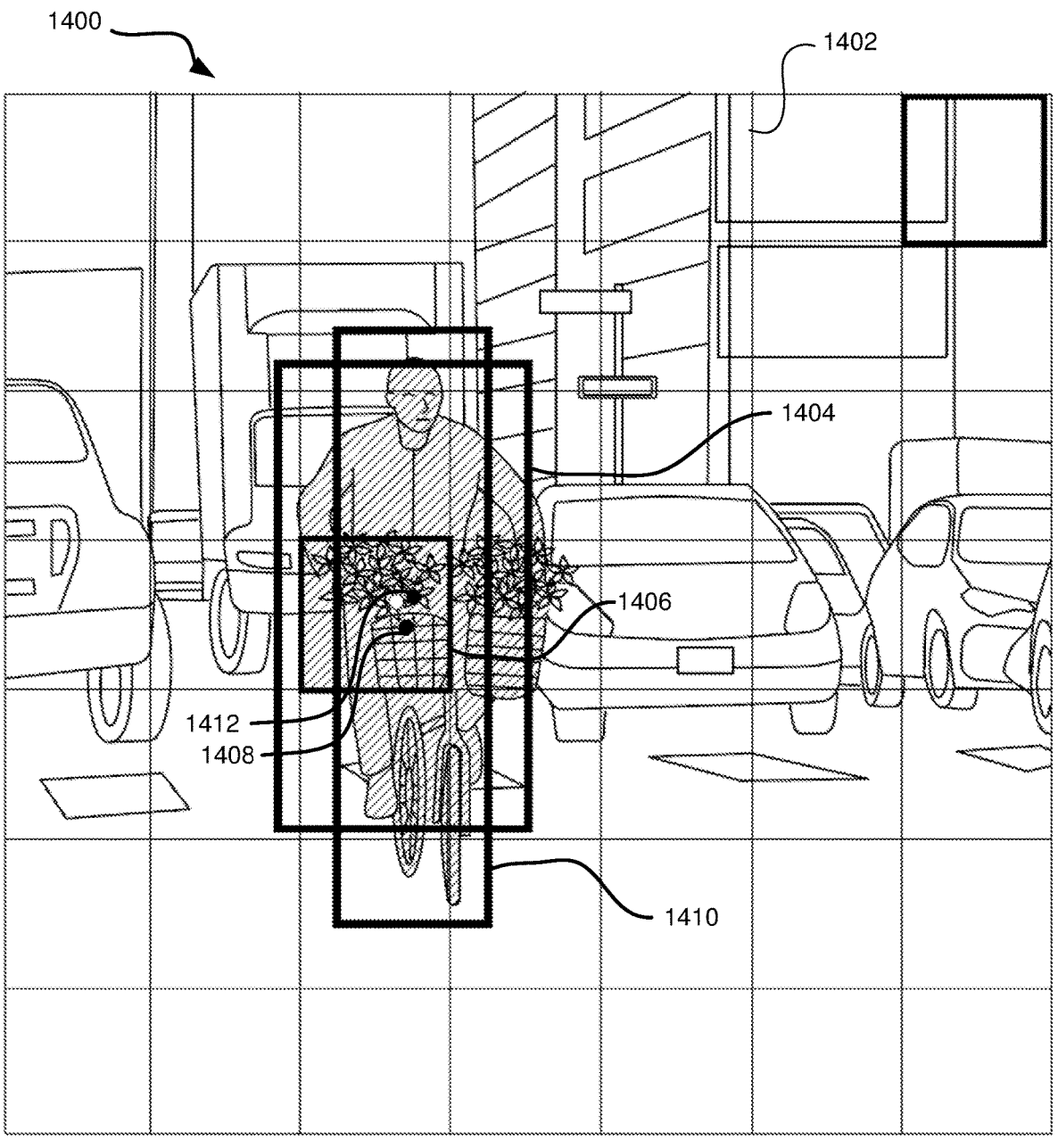
FIG. 15 illustrates an example implementation of a model for identifying and classifying objects of interest.
Figure 16:
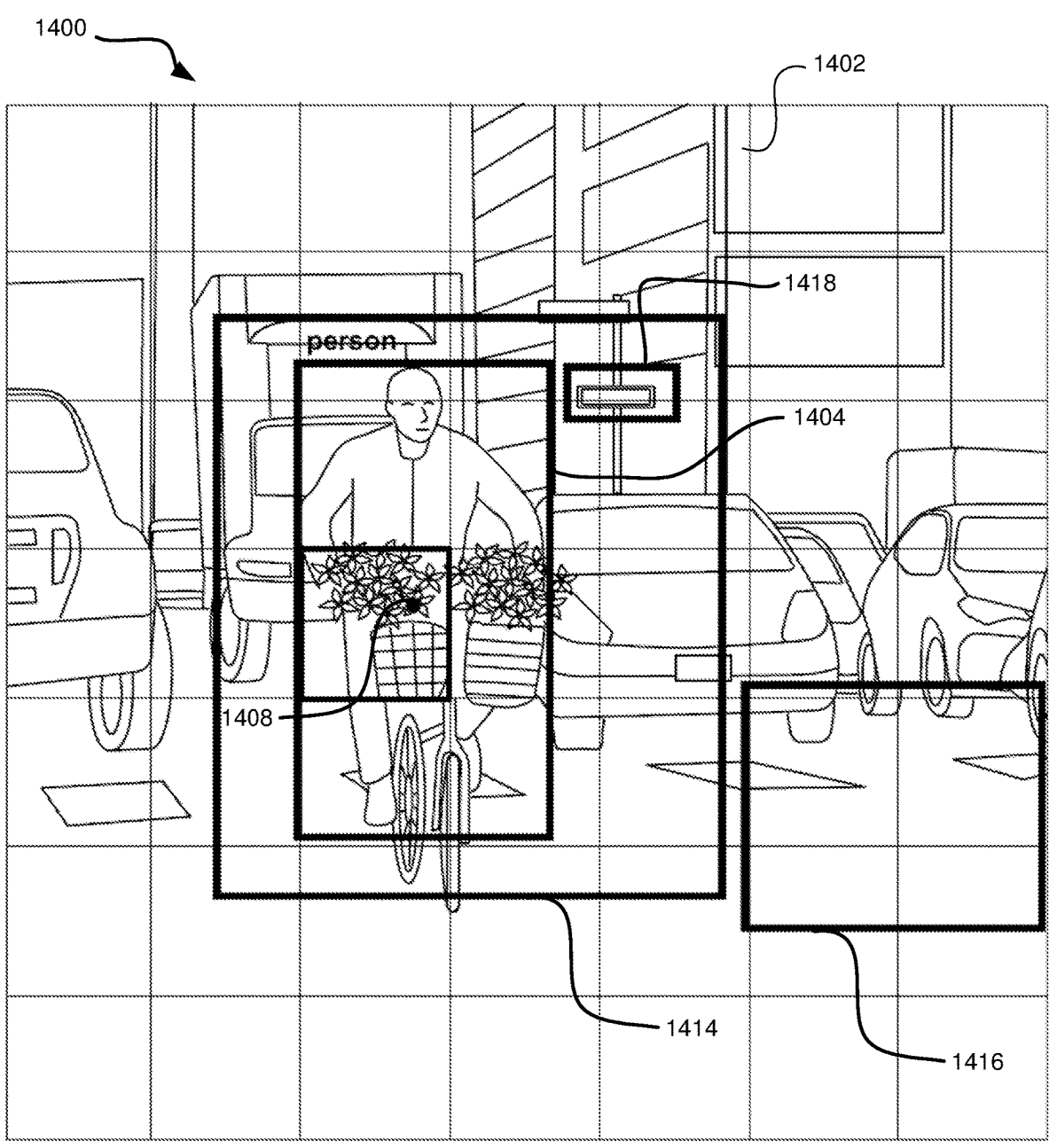
FIG. 16 illustrates an example implementation of a model for identifying and classifying objects of interest.

FIGS. 14-16 illustrate a labeling protocol and process flow for preparing a training dataset for a neural network or implementing the image processing algorithm described herein with a trained neural network. Each of FIGS. 14-16 depict the same image of a street scene including a person riding a bicycle, multiple vehicles driving on a road, multiple buildings to the side of the road, and a street sign.

In the example implementation of the labeling protocol that is depicted in FIGS. 14-16, the neural network is trained to identify persons and street signs with a foreground classification. The neural network is further trained to implicitly indicate that other objects, such as vehicles, buildings, trees, road surface, and so forth have a background classification. The input image is partitioned into a plurality of grid units using vertical and horizontal grid lines 1402. Each of the plurality of grid units comprises an equivalent size, and each of the plurality of grid units is fed through the trained neural network to identify which of the grid units comprises an object of interest.

According to the labeling protocol, a bounding box 1404 is drawn around a person, which has a foreground classification. The center point 1408 of the person is identified, and then then grid unit 1406 comprising the center point of the person is identified and highlighted. An additional bounding box 1410 may be drawn around the person, which will have its own center point 1412. As shown in FIG. 15, the grid unit 1406 comprising the center point 1408, 1412 of the person is the same grid unit 1406 regardless of which bounding box 1404, 1410 is used.

Further according to the labeling protocol, certain bounding boxes are drawn around background, and these bounding boxes are given the explicit background classification. FIG. 16 illustrates a first background bounding box 1414 and a second background bounding box 1416. The portions of the first background bounding box 1414 that overlap the person bounding box 1404 will be treated with the foreground classification, because the neural network is trained to override a background classification with a foreground classification.

Further according to the labeling protocol, an explicit bounding box is drawn around a street sign to generate a street sign bounding box 1418. The neural network is trained to treat the street sign bounding box 1418 with a foreground classification even though it overlaps the first background bounding box 1414.

According to the labeling protocol, the neural network is trained to ignore unlabeled parts of the image. The neural network learns background only learned from areas that are explicitly labeled with the background classification. This provides better granularity to the labeler as to what is and is not taught to the image processing algorithm.

The neural network independently assesses each grid unit within the image to determine whether that grid unit likely includes the object of interest (i.e., a person or street sign). The neural network draws an anchor box around the object of interest and then identifies a center point of the object of interest. The neural network further selects the grid unit that includes the center point of the object of interest.

When the neural network is to be trained to identify street signs in addition to persons (see FIG. 16), the training dataset only needs to be updated to also label every street sign within the existing bounding boxes in the training dataset. As shown in FIGS. 15-16, the background is explicitly labeled with the first and second background bounding boxes 1414, 1416, which each explicitly comprise the background classification. In this case, the neural network is only learning from those portions of the image that are explicitly labeled, including the explicitly labeled background and the explicitly labeled objects of interest (i.e., the person and the street sign).

According to the labeling protocol, bounding boxes within the training dataset that comprise the foreground classification will encourage the neural network to make an object of interest prediction within those bounding boxes. Additionally, training bounding boxes comprising the background classification inhibit the neural network from making an object of interest prediction within those bounding boxes. Further, training bounding boxes comprising each of the foreground classification and the background classification (see, e.g., overlap with 1404 and 1414 or overlap with 1418 and 1414) will encourage the neural network to make an object of interest prediction where the foreground classification overlaps the background classification.

According to the labeling protocol described herein, the training dataset may further include bounding boxes with the exclude classification. Bounding boxes with the exclude classification will override all other classifications, including the foreground classification and the background classification. During training of the neural network, if a bounding box comprising the exclude classification comprises a center point of a bounding box comprising the foreground classification, then a loss function will disregard all loss from the bounding box comprising the foreground classification. Further, during training of the neural network, if a region of a bounding box comprising the background classification overlaps a bounding box comprising the exclude classification, then the loss function will disregard loss from the overlapping region.

Figure 17:
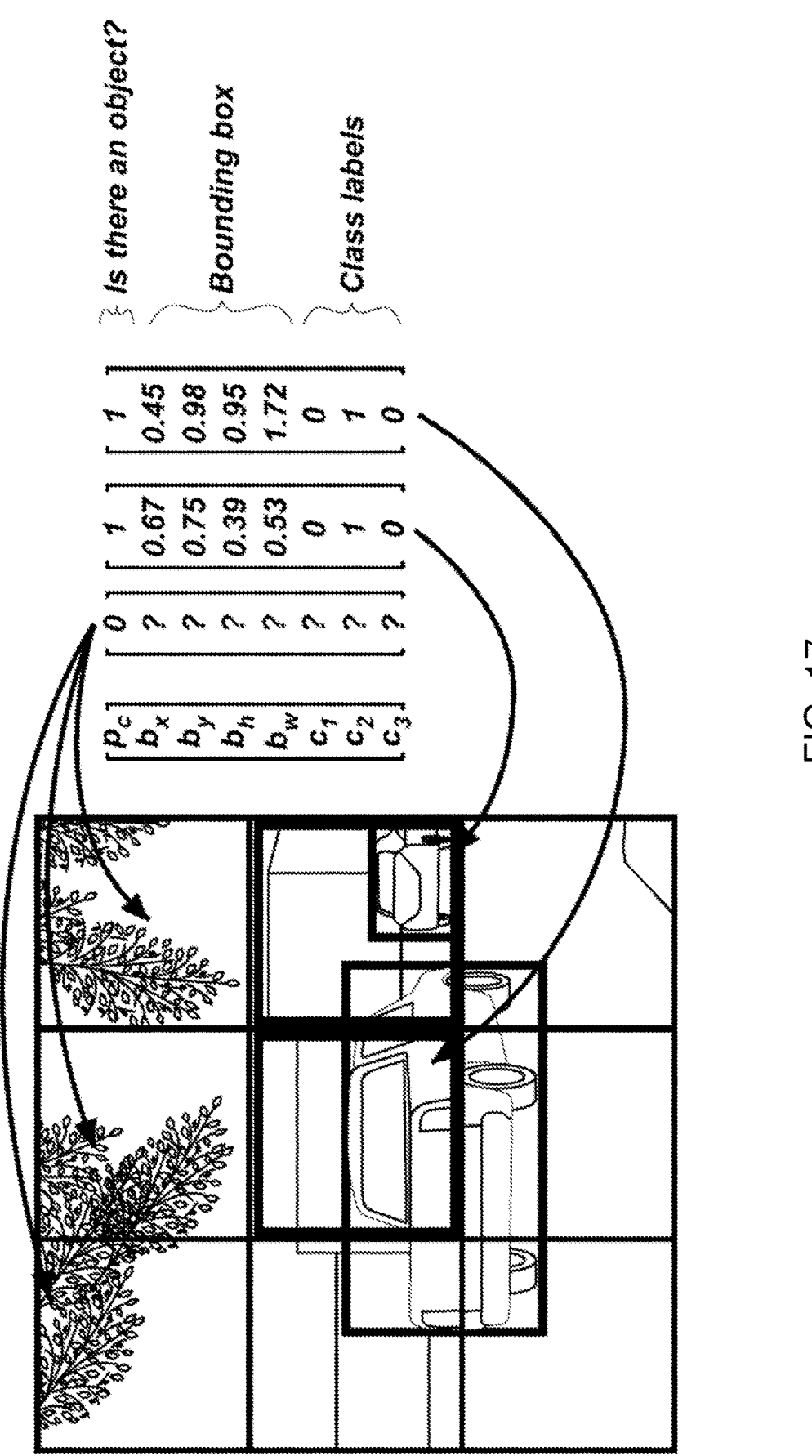
FIG. 17 illustrates an example implementation of a model for identifying and classifying objects of interest.

FIG. 17 illustrates an example implementation of the image processing algorithm described herein.

Figure 18:
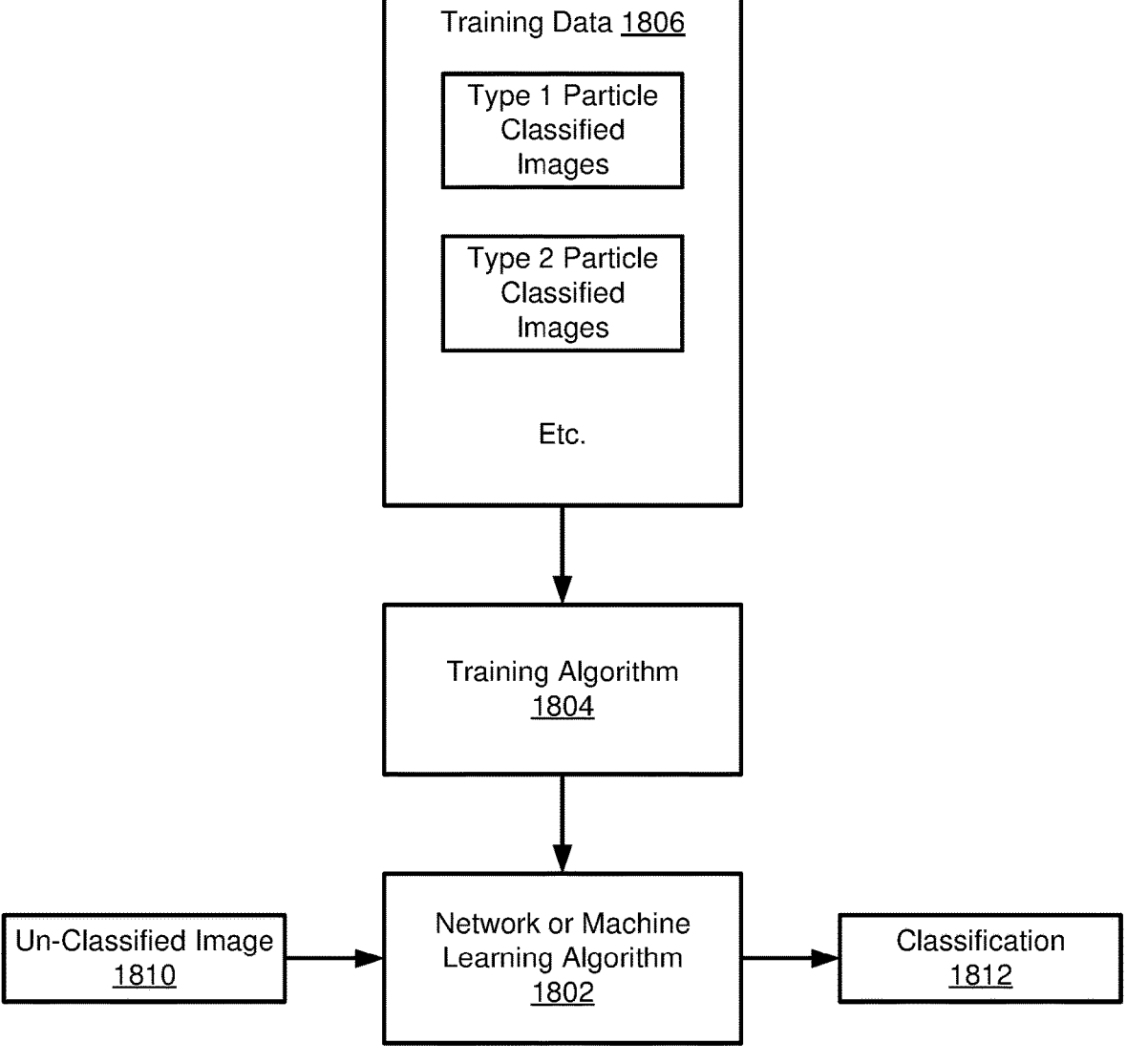
FIG. 18 is a schematic block diagram illustrating operation of a classification system.

FIG. 18 is a schematic block diagram illustrating operation of a classification system according to one embodiment. In one embodiment, a network or machine learning algorithm 1802 (which may also be referred to as a hypothesis), may be trained and used for identifying and classifying or detecting particles in an image. The network or machine learning algorithm 1802 may include a neural network, such as a deep convolution neural network, or other machine learning model or algorithm for classifying or identifying particle types.

In one embodiment, the network or machine learning algorithm 1802 is trained using a training algorithm 1804 based on training data 1806. The training data 1806 may include images of particles or materials and their designated classifications. For example, the training data may include images classified as including particles or materials of a first type and images classified as including particles or materials of a second type. The types of the particles or materials may vary significantly based on the type of examination or report that is needed. Training data for any other type of particle, material type, or the like may be used. For example, training data for any particles that are to be identified by the machine learning algorithm 1802 may be provided. Using the training data, the training algorithm 1804 may train the machine learning algorithm 1802. For example, the training algorithm 1804 may use any type or combination of supervised or unsupervised machine learning algorithms.

Once the network or machine learning algorithm 1802 is trained, the network or machine learning algorithm 1802 may be used to identify or predict the type of particle within an image. For example, an unclassified image 1810 (or previously classified image with the classification information removed) is provided to the network or machine learning algorithm 1802 and the network or machine learning algorithm 1802 outputs a classification 1812. The classification 1812 may indicate a yes or no for the presence of a specific type of particle. For example, the network or machine learning algorithm 1802 may be targeted to detecting whether a specific type of mold, bacteria, particle, or material is present in the un-classified image 1810. Alternatively, the classification 1812 may indicate one of many types that may be detected by the network or machine learning algorithm 1802. For example, the network or machine learning algorithm 1802 may provide a classification that indicates which type of particle is present in the un-classified image 1810. During training, the classification 1812 may be compared to a human classification or an out-of-channel classification to determine how accurate the network or machine learning algorithm 1802 is. If the classification 1812 is incorrect, the un-classified image 1810 may be assigned a classification from a human and used as training data 1806 to further improve the network or machine learning algorithm 1802.

In one embodiment, both offline and online training of the network or machine learning algorithm 1802 may be performed. For example, after an initial number of rounds of training, an initial accuracy level may be achieved. The network or machine learning algorithm 1802 may then be used to assist in classification with close review by human workers. As additional data comes in the data may be classified by the network or machine learning algorithm 1802, reviewed by a human, and then added to a body of training data for use in further refining training of the network or machine learning algorithm 1802. Thus, the more the network or machine learning algorithm 1802 is used, the better accuracy it may achieve. As the accuracy is improved, less and less oversight of human workers may be needed.

As discussed previously, machine learning algorithms or neural networks must generally be trained before using them. However, training data can be difficult to obtain. Regarding mold spores, for example, images of specific types of mold spores may be rare. Similarly, it may sometimes be necessary to distinguish between two similar mold spores (or visually identical at least to a human). Such training may be difficult to do well without samples containing both types of mold spores since other differences in the slide, background material, included material, or the like in a sample may differ between samples. If the two different classifications of mold spores are not located in the same imaged sample, then the training algorithms may inaccurately distinguish between particles based on these other details which may lower classification accuracy.

To improve distinction between visually similar or hard to find particles, synthetic images may be generated for training. For example, particles or mold spores may be segmented from different source images and placed on a shared background to create a synthetic microscopy image. Particles or mold spores may be segmented from the source images using automatic segmentation algorithms, such as intelligent scissors, magic scissors, watershed, grabcut, TVSeg, segmentation, or boundary finding algorithms. For example, a source image (e.g., an image of a cultured population or sample of mold spores) may be processed to locate spores or particles within the source image and/or create anchor boxes around the spores or particles. Once those locations are determined, an automatic segmentation algorithm may be used to "cut out" the pixels corresponding to the particle within the anchor boxes and then "paste" them onto a background to create the synthetic image.

Figure 19:
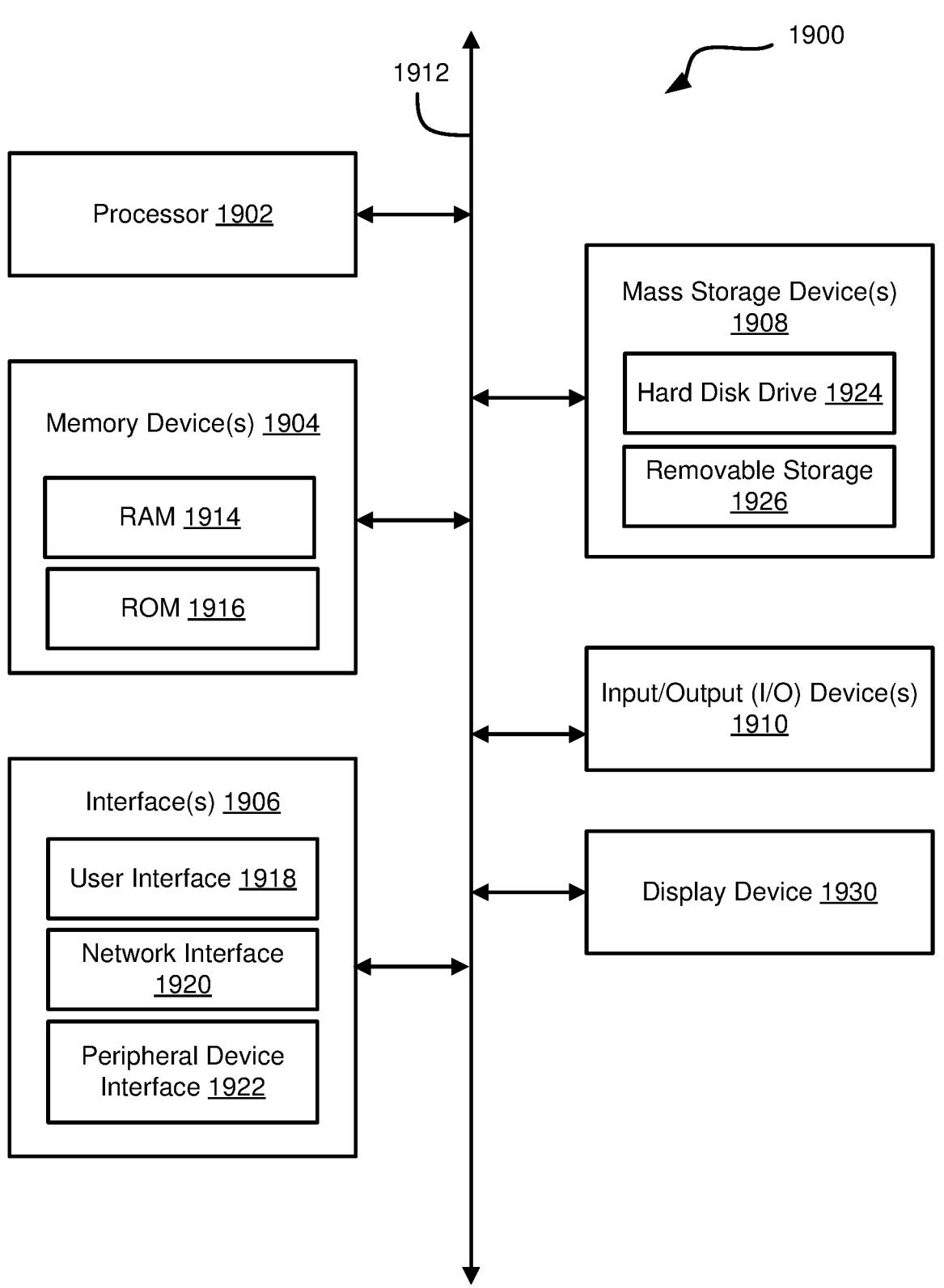
FIG. 19 illustrates a block diagram of an example computing device in accordance with the teachings and principles of the disclosure.

Referring now to FIG. 19, a block diagram of an example computing device 1900 is illustrated. Computing device 1900 may be used to perform various procedures, such as those discussed herein. Computing device 1900 can perform various monitoring functions as discussed herein, and can execute one or more application programs, such as the application programs or functionality described herein. Computing device 1900 can be any of a wide variety of computing devices, such as a desktop computer, in-dash computer, vehicle control system, a notebook computer, a server computer, a handheld computer, tablet computer and the like.

Computing device 1900 includes one or more processor(s) 1902, one or more memory device(s) 1904, one or more interface(s) 1906, one or more mass storage device(s) 1908, one or more Input/output (I/O) device(s) 1910, and a display device 1930 all of which are coupled to a bus 1912. Processor(s) 1902 include one or more processors or controllers that execute instructions stored in memory device(s) 1904 and/or mass storage device(s) 1908. Processor(s) 1902 may also include diverse types of computer-readable media, such as cache memory.

Memory device(s) 1904 include various computer-readable media, such as volatile memory (e.g., random access memory (RAM) 1914) and/or nonvolatile memory (e.g., read-only memory (ROM) 1916). Memory device(s) 1904 may also include rewritable ROM, such as Flash memory.

Mass storage device(s) 1908 include various computer readable media, such as magnetic tapes, magnetic disks, optical disks, solid-state memory (e.g., Flash memory), and so forth. As shown in FIG. 19, a particular mass storage device 1908 is a hard disk drive 1924. Various drives may also be included in mass storage device(s) 1908 to enable reading from and/or writing to the various computer readable media. Mass storage device(s) 1908 include removable media 1926 and/or non-removable media.

I/O device(s) 1910 include various devices that allow data and/or other information to be input to or retrieved from computing device 1900. Example I/O device(s) 1910 include cursor control devices, keyboards, keypads, microphones, monitors or other display devices, speakers, printers, network interface cards, modems, barcode scanners, and the like.

Display device 1930 includes any type of device capable of displaying information to one or more users of computing device 1900. Examples of display device 1930 include a monitor, display terminal, video projection device, and the like.

Interface(s) 1906 include various interfaces that allow computing device 1900 to interact with other systems, devices, or computing environments. Example interface(s) 1906 may include any number of different network interfaces 1920, such as interfaces to local area networks (LANs), wide area networks (WANs), wireless networks, and the Internet. Other interface(s) include user interface 1918 and peripheral device interface 1922. The interface(s) 1906 may also include one or more user interface elements 1918. The interface(s) 1906 may also include one or more peripheral interfaces 1922 such as interfaces for printers, pointing devices (mice, track pad, or any suitable user interface now known to those of ordinary skill in the field, or later discovered), keyboards, and the like.

Bus 1912 allows processor(s) 1902, memory device(s) 1904, interface(s) 1906, mass storage device(s) 1908, and I/O device(s) 1910 to communicate with one another, as well as other devices or components coupled to bus 1912. Bus 1912 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 900 and are executed by processor(s) 902. Alternatively, the systems and procedures described herein can be implemented in hardware, or a combination of hardware, software, and/or firmware. For example, one or more application specific integrated circuits (ASICs) can be programmed to conduct one or more of the systems and procedures described herein.

EXAMPLES

The following examples pertain to further embodiments of the disclosure.

Example 1 is a method. The method includes receiving an input image. The method includes partitioning the input image into a plurality of grid units. The method includes providing each of the plurality of grid units to a neural network trained to identify an object of interest within the input image, wherein the neural network is trained to calculate a confidence score for each of the plurality of grid units indicating a likelihood that a grid unit comprises the object of interest.

Example 2 is a method as in Example 1, wherein the neural network independently assesses each of the plurality of grid units.

Example 3 is a method as in any of Examples 1-2, wherein the neural network calculates the confidence score for a first grid unit based on image data within the grid unit and further based on image data within the input image that is not present within the grid unit.

Example 4 is a method as in any of Examples 1-3, wherein the neural network is a convolutional neural network.

Example 5 is a method as in any of Examples 1-4, wherein each of the plurality of grid units comprises equivalent dimensions.

Example 6 is a method as in any of Examples 1-5, further comprising receiving the confidence score from the neural network, wherein a confidence score of zero indicates that the grid unit is unlikely to comprise the object of interest.

Example 7 is a method as in any of Examples 1-6, further comprising receiving the confidence score from the neural network for the grid unit, wherein a confidence score of one indicates that the grid unit is likely to comprise the object of interest.

Example 8 is a method as in any of Examples 1-7, further comprising, in response to receiving an indication that the grid unit is unlikely to comprise the object of interest, classifying the image data within the grid unit as explicit background.

Example 9 is a method. The method includes partitioning an input image into a plurality of grid units. The method includes individually processing each of the plurality of grid units with a neural network configured to calculate a confidence score indicating a likelihood that a grid unit comprises an object of interest. The method includes generating a bounding box around the object of interest. The method includes identifying one or more grid units of the plurality of grid units that comprise a portion of the bounding box. The method includes identifying which of the one or more grid units comprises a center point of the bounding box.

Example 10 is a method as in Example 9, further comprising executing a loss function to ignore all grid units of the plurality of grid units that are assigned a confidence score indicating a low likelihood of comprising an object of interest.

Example 11 is a method as in any of Examples 9-10, further comprising providing image data within the bounding box to a neural network trained to classify an identity of the object of interest within the bounding box.

Example 12 is a method as in any of Examples 9-11, further comprising calculating x-axis coordinates, y-axis coordinates, width, and height of each of the plurality of grid units.

Example 13 is a method as in any of Examples 9-12, further comprising calculating, for each of the one or more grid units, a percentage of the bounding box that is located within each of the one or more grid units.

Example 14 is a method as in any of Examples 9-13, further comprising training the neural network on a training dataset comprising a plurality of training images, wherein the plurality of training images comprise bounding box classifications selected from a list comprising: foreground, anti-class, background, exclude, merge, and ignore.

Example 15 is a method as in any of Examples 9-14, wherein the training dataset identifies training bounding boxes as comprising the foreground classification if a user determines those training bounding boxes comprise an object of interest that is selected to be detected and classified by the neural network.

Example 16 is a method as in any of Examples 9-15, wherein training bounding boxes comprising the anti-class classification instruct the neural network to separate training bounding boxes comprising the foreground classification from training bounding boxes comprising background classification; and wherein the neural network is instructed to treat training bounding boxes comprising the anti-class classification as a foreground object for classification and as a background object for reporting.

Example 17 is a method as in any of Examples 9-16, wherein training bounding boxes comprising the foreground classification encourage the neural network to make an object of interest prediction within those training bounding boxes; and wherein training bounding boxes comprising the background classification inhibit the neural network from making an object of interest prediction within those training bounding boxes.

Example 18 is a method as in any of Examples 9-17, wherein the neural network is instructed that training bounding boxes comprising the exclude classification will override training bounding boxes comprising either of the background classification or the foreground classification such that: during training of the neural network, if a bounding box comprising the exclude classification contains the center of a bounding box comprising the foreground classification, then the neural network will disregard the bounding box comprising the foreground classification; and during training of the neural network, if a region of a bounding box comprising the background classification overlaps a bounding box comprising the exclude classification, then the neural network will disregard the overlapping portion of the background classification bounding box.

Example 19 is a method as in any of Examples 9-18, wherein the merge classification indicates that two or more types of objects of interest are merged into a single class.

Example 20 is a method as in any of Examples 9-19, wherein the ignore classification indicates that a training object of interest within a bounding box comprising the ignore classification should be treated by the neural network as if the training object of interest does not exist.

Example 21 is a method as in any of Examples 9-20, wherein the plurality of grid units each comprise equivalent dimensions.

Example 22 is a method as in any of Examples 9-21, wherein generating the bounding box around the object of interest comprises selecting dimensions for the bounding box based on dimensions of the object of interest; and wherein the method further comprises determining an identity of the object of interest based only on pixel data within the bounding box.

Example 23 is a method as in any of Examples 9-22, wherein the input image depicts one or more of cells, viruses, bacteria, mold spores, or fibers.

Example 24 is a method as in any of Examples 9-23, wherein the input image is captured by an image sensor associated with a microscope, and wherein the input image comprises a microscope slide image.

Example 25 is a method as in any of Examples 9-24, further comprising training the neural network with a plurality of synthetic images; wherein the plurality of synthetic images comprises pixel values depicting particles segmented from sources images and placed on a synthetic background to generate a synthetic microscopy slide image.

Example 26 is a method as in any of Examples 9-25, wherein the particles depicted in the plurality of synthetic images comprises one or more of cells, viruses, bacteria, mold spores, or fibers.

Example 27 is a method as in any of Examples 9-26, further comprising generating a synthetic image for training the neural network using an automated segmentation algorithm configured to: receive a non-synthetic microscopy slide image comprising an object bounding box around a plurality of object pixels; crop out the plurality of object pixels within the object bounding box; and paste the plurality of object pixels on to a synthetic background.

Example 28 is a method as in any of Examples 9-27, further comprising: during training of the neural network, evaluating whether the confidence score indicating the likelihood that the grid unit comprises the object of interest is correct; and in response to the neural network outputting an incorrect confidence score, penalizing the neural network using a loss function.

Example 29 is a system comprising one or more processors configured to execute instructions stored in non-transitory computer readable storage medium. The instructions comprise any of the method steps of Examples 1-28.

Example 30 is non-transitory computer readable storage medium storing instructions for execution by one or more processors. The instructions comprise any of the method steps of Examples 1-28.

The embodiments of systems, methods, and devices discussed herein may be applied to a wide range of sample types for detection of various particles, materials, or the like. The following paragraphs describe diverse types of samples which may be imaged and identified using methods, systems, or devices disclosed herein.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Many of the functional units described in this specification may be implemented as one or more components, which is a term used to emphasize their implementation independence more particularly. For example, a component may be implemented as a hardware circuit comprising custom very large-scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by diverse types of processors. An identified component of executable code may, for instance, include one or more physical or logical blocks of computer instructions, which may, for instance, be organized as an object, a procedure, or a function. Nevertheless, the executables of an identified component need not be physically located together but may include disparate instructions stored in separate locations that, when joined logically together, include the component, and achieve the stated purpose for the component.

Indeed, a component of executable code may be a single instruction, or many instructions, and may even be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over separate locations including over different storage devices, and may exist, at least partially, merely as electronic signals on a system or network. The components may be passive or active, including agents operable to perform desired functions.

Implementations of the disclosure can also be used in cloud computing environments. In this application, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, or any suitable characteristic now known to those of ordinary skill in the field, or later discovered), service models (e.g., Software as a Service (SaaS), Platform as a Service (PaaS), Infrastructure as a Service (IaaS)), and deployment models (e.g., private cloud, community cloud, public cloud, hybrid cloud, or any suitable service type model now known to those of ordinary skill in the field, or later discovered). Databases and servers described with respect to the disclosure can be included in a cloud model.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the claims, if any.

When labeling images, it is possible for the labeler to want to have an area be labeled as background, except for a small area around it. This creates a "donut" like shape where there are one or more "holes" in the background label. These "holes" are created by drawing an "exclude" label over the background label. Where exclude labels exist, it is functionally equivalent to not having another label there. Exclude boxes allow for even more detailed labeling of images.

What is claimed is:

1. A method comprising:
partitioning an input image into a plurality of grid units;
individually processing each of the plurality of grid units with a neural network configured to calculate a confidence score indicating a likelihood that a grid unit comprises an object of interest;
generating a bounding box around the object of interest;
identifying one or more grid units of the plurality of grid units that comprise a portion of the bounding box; and
identifying which of the one or more grid units comprises a center point of the bounding box;
wherein the neural network is trained according to a labeling protocol comprising an exclude classification that instructs the neural network to override bounding boxes comprising either of a background classification or a foreground classification.

2. The method of claim 1, further comprising executing a loss function to ignore all grid units of the plurality of grid units based on the labeling protocol for an object of interest.

3. The method of claim 1, further comprising providing image data within the bounding box to a neural network trained to classify an identity of the object of interest within the bounding box.

4. The method of claim 1, further comprising calculating x-axis coordinates, y-axis coordinates, width, and height of each of the plurality of grid units.

5. The method of claim 1, further comprising calculating, for each of the one or more grid units, a percentage of the bounding box that is located within each of the one or more grid units.

6. The method of claim 1, further comprising training the neural network on a training dataset comprising a plurality of training images, wherein the plurality of training images are labeled according to the labeling protocol, and wherein the labeling protocol comprises bounding box classification types selected from a list comprising: the foreground classification, an anti-class classification, the background classification, the exclude classification, a merge classification, and an ignore classification.

7. The method of claim 6, wherein the training dataset identifies training bounding boxes as comprising the foreground classification if a user determines those training bounding boxes comprise an object of interest that is selected to be detected and classified by the neural network.

8. The method of claim 6, wherein training bounding boxes comprising the anti-class classification instruct the neural network to separate training bounding boxes comprising the foreground classification from training bounding boxes comprising background classification; and wherein the neural network is instructed to treat training bounding boxes comprising the anti-class classification as a foreground object for classification and as a background object for reporting.

9. The method of claim 6, wherein training bounding boxes comprising the foreground classification encourage the neural network to make an object of interest prediction within the training bounding boxes comprising the foreground classification;

wherein training bounding boxes comprising the background classification inhibit the neural network from making an object of interest prediction within the training bounding boxes comprising the background classification; and wherein training bounding boxes comprising each of the foreground classification and the background classification encourage the neural network to make an object of interest prediction where the foreground classification and the background classification overlap.

10. The method of claim 6, wherein the neural network is instructed that training bounding boxes comprising the exclude classification will override training bounding boxes comprising either of the background classification or the foreground classification such that:

during training of the neural network, if a bounding box comprising the exclude classification comprises a center of a bounding box comprising the foreground classification, then a loss function will disregard all loss from the bounding box comprising the foreground classification; and during training of the neural network, if a region of a bounding box comprising the background classification overlaps a bounding box comprising the exclude classification, then the loss function will disregard loss from the overlapping region.

11. The method of claim 6, wherein the merge classification indicates that two or more types of objects of interest are merged into a single class.

12. The method of claim 6, wherein the ignore classification indicates that a training object of interest within a bounding box comprising the ignore classification should be treated by the neural network as if the training object of interest does not exist.

13. The method of claim 1, wherein the plurality of grid units each comprise equivalent dimensions.

14. The method of claim 1, wherein generating the bounding box around the object of interest comprises selecting dimensions for the bounding box based on dimensions of the object of interest.

15. The method of claim 1, wherein the input image depicts one or more of cells, viruses, bacteria, mold spores, or fibers.

16. The method of claim 1, wherein the input image is captured by an image sensor associated with a microscope, and wherein the input image comprises a microscope slide image.

17. The method of claim 1, further comprising training the neural network with a plurality of synthetic images;

wherein the plurality of synthetic images comprises pixel values depicting particles segmented from sources images and placed on a synthetic background to generate a synthetic microscopy slide image.

18. The method of claim 17, wherein the particles depicted in the plurality of synthetic images comprises one or more of cells, viruses, bacteria, mold spores, or fibers.

19. The method of claim 1, further comprising generating a synthetic image for training the neural network using an automated segmentation algorithm configured to:

receive a non-synthetic microscopy slide image comprising an object bounding box around a plurality of object pixels;

crop out the plurality of object pixels within the object bounding box; and paste the plurality of object pixels on to a synthetic background.

20. The method of claim 1, further comprising:

during training of the neural network, evaluating whether the confidence score indicating the likelihood that the grid unit comprises the object of interest is correct; and in response to the neural network outputting an incorrect confidence score, penalizing the neural network using a loss function.

* * * * *